(12) United States Patent
Semba et al.

(10) Patent No.: US 11,373,021 B2
(45) Date of Patent: Jun. 28, 2022

(54) SIMULATION METHOD, COMPUTER-READABLE STORAGE MEDIUM AND SIMULATION DEVICE

(71) Applicant: CASIO COMPUTER CO., LTD., Tokyo (JP)

(72) Inventors: Takao Semba, Hachioji (JP); Junji Hobo, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 249 days.

(21) Appl. No.: 16/749,909

(22) Filed: Jan. 22, 2020

(65) Prior Publication Data

US 2020/0250361 A1    Aug. 6, 2020

(30) Foreign Application Priority Data

Feb. 6, 2019  (JP) .............................. JP2019-019942
Feb. 6, 2019  (JP) .............................. JP2019-019945

(51) Int. Cl.
*G06F 30/20* (2020.01)
*G06F 111/20* (2020.01)
*G06F 111/10* (2020.01)

(52) U.S. Cl.
CPC .......... *G06F 30/20* (2020.01); *G06F 2111/10* (2020.01); *G06F 2111/20* (2020.01)

(58) Field of Classification Search
CPC ... G06F 30/20; G06F 2111/20; G06F 2111/10
See application file for complete search history.

(56) References Cited

U.S. PATENT DOCUMENTS

| | | | | |
|---|---|---|---|---|
| 2006/0033032 | A1* | 2/2006 | Inoue | G01T 1/2018 250/370.11 |
| 2014/0110887 | A1* | 4/2014 | Horiuchi | B41J 3/4073 264/413 |
| 2018/0147755 | A1* | 5/2018 | Fukushima | B32B 3/28 |
| 2018/0169932 | A1* | 6/2018 | Saito | B29C 35/0805 |
| 2018/0174289 | A1 | 6/2018 | Fukushima et al. | |
| 2018/0264865 | A1* | 9/2018 | Motoyanagi | B41J 11/00212 |

(Continued)

FOREIGN PATENT DOCUMENTS

| | | | | |
|---|---|---|---|---|
| EP | 3611649 A1 * | 2/2020 | | B41M 3/06 |
| JP | S6428660 A | 1/1989 | | |

(Continued)

*Primary Examiner* — Thai Q Phan
(74) *Attorney, Agent, or Firm* — Holtz, Holtz & Volek PC

(57) ABSTRACT

A simulation method includes setting a density of a conversion layer which is formed in a medium which has a thermal expansion layer which expands with heat and converts electromagnetic waves into heat, deriving a temperature of the conversion layer which is obtained in a case where the conversion layer which has the set density is irradiated with the electromagnetic waves, executing a simulation relating to heat conduction which takes place in a direction along a surface of the medium in the medium on the basis of a condition which is defined in accordance with the medium and correcting the derived temperature on the basis of a result of execution of the simulation, and deriving an expansion height up to which the medium expands in a case where the medium is heated at the corrected temperature.

23 Claims, 14 Drawing Sheets

(56) References Cited

U.S. PATENT DOCUMENTS

2019/0023026 A1    1/2019  Numao et al.
2019/0283285 A1*   9/2019  Motoyanagi ........ B29C 44/3415

FOREIGN PATENT DOCUMENTS

| JP | H08118780   | A |   | 5/1996  |             |
|----|-------------|---|---|---------|-------------|
| JP | 2001150812  | A |   | 6/2001  |             |
| JP | 2012230665  | A | * | 11/2012 | ... G03F 7/004 |
| JP | 2013178353  | A |   | 9/2013  |             |

* cited by examiner

FIG. 11
HEAT CONDUCTION DATA                                323
| TYPE OF SHEET | HEAT CONDUCTION COEFFICIENT (FRONT) | HEAT CONDUCTION COEFFICIENT (BACK) |
|---|---|---|
| SHEET A | 30 | 25 |
| SHEET B | 35 | 30 |
| SHEET C | 23 | 17 |
| ⋮ | ⋮ | ⋮ |
FIG. 12
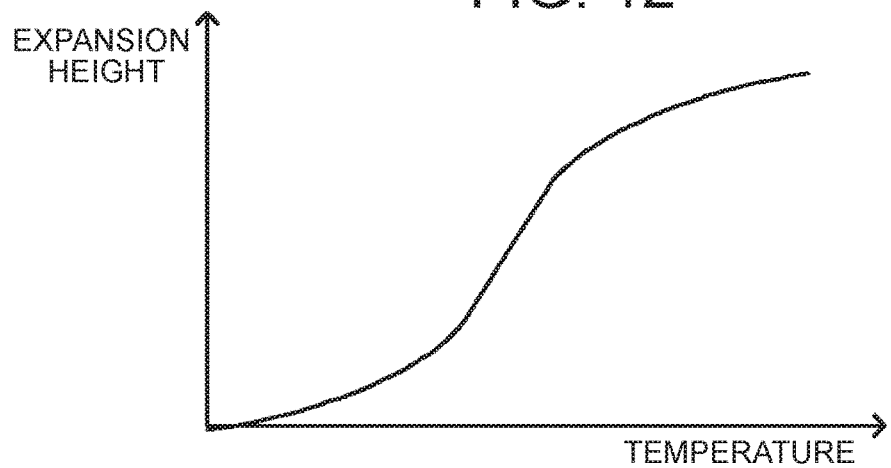
FIG. 13
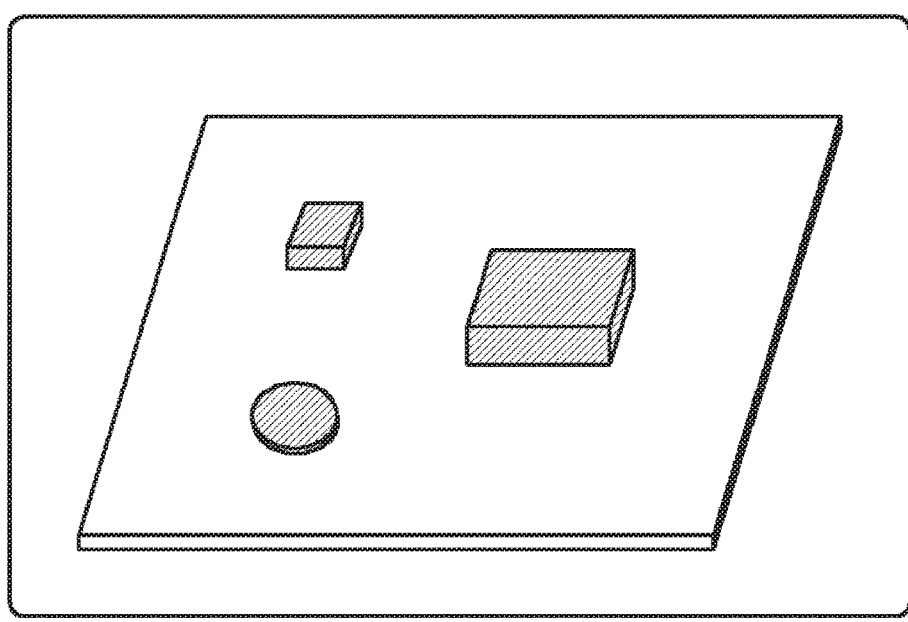

FIG. 20
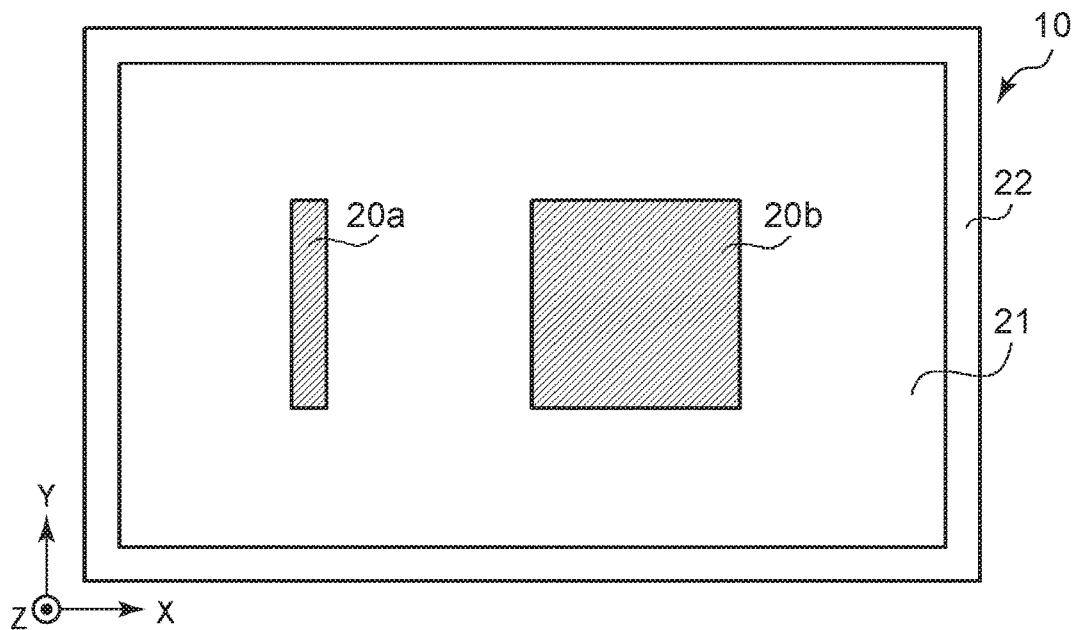
FIG. 21
THRESHOLD VALUE DATA
| TYPE OF SHEET | THRESHOLD VALUE TH1(FRONT) | THRESHOLD VALUE TH2(BACK) | THRESHOLD VALUE TH3(FRONT + BACK) |
|---|---|---|---|
| SHEET A | 3.0 mm | 2.5 mm | 4.5 mm |
| SHEET B | 2.3 mm | 1.5 mm | 3.2 mm |
| SHEET C | 2.5 mm | 1.8 mm | 4.0 mm |
| ⋮ | ⋮ | ⋮ | ⋮ |
FIG. 22
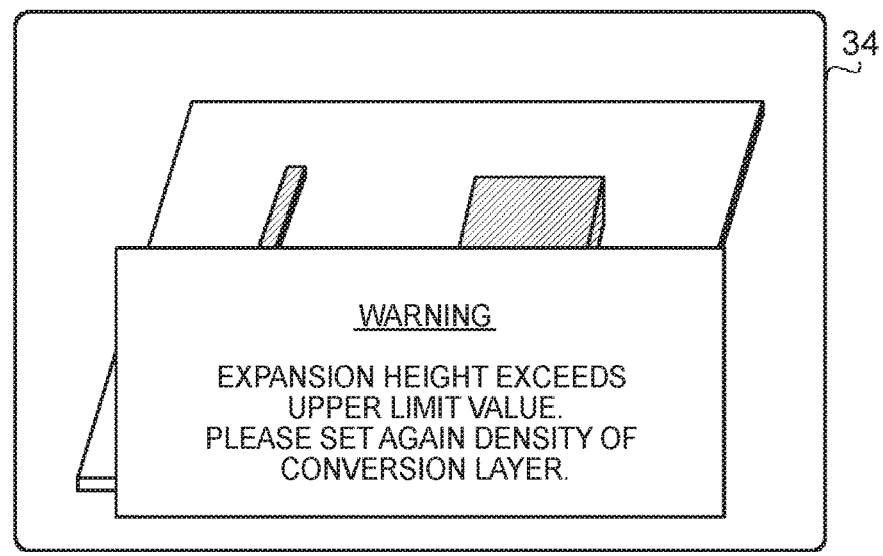

US 11,373,021 B2

SIMULATION METHOD, COMPUTER-READABLE STORAGE MEDIUM AND SIMULATION DEVICE

CROSS REFERENCE TO RELATED APPLICATIONS

This application is based upon and claims the benefit of priority under 35 USC 119 of Japanese Patent Application No. 2019-019942 filed on Feb. 6, 2019 and Japanese Patent Application No. 2019-019945 filed on Feb. 6, 2019 the entire disclosures of which, including the description, claims, drawings, and abstract, are incorporated herein by reference in its entirety.

FIELD

The present invention relates to a simulation method, a computer-readable storage medium and a simulation device.

BACKGROUND

A technique of forming a shaped object by expanding a medium which has a thermal expansion layer which expands with heat is known. For example, Japanese Patent Application Laid Open No. Sho 64(1989)-28660 and Japanese Patent Application Laid Open No. 2001-150812 each disclose a method of forming a stereoscopic image which is an image which has a three-dimensional expanse as the shaped object. Specifically describing, in the method which is disclosed in each of Japanese Patent Application Laid Open No. Sho 64(1989)-28660 and Japanese Patent Application Laid Open No. 2001-150812, a pattern is formed on a back face of a thermally expandable sheet which has the thermal expansion layer by using a material which is excellent in optical absorption property and the pattern which is so formed is heated by irradiating the pattern with light (electromagnetic waves) by an irradiation unit. Thereby, a part of the thermally expandable sheet on which the pattern is formed expands and swells and thereby the stereoscopic image is formed.

In such a shaped object forming technique as described above, there are cases where the thermal expansion layer is heated to a temperature which is different from an expected temperature because heat conduction occurs in the medium in a case of heating the medium having the thermal expansion layer. In such a case, such a problem arises that it is difficult to precisely estimate how high the medium actually expands.

The present invention has been made in order to solve the problem such as the above and aims to provide a simulation method, a computer-readable storage medium and a simulation device which make it possible to precisely estimate an expansion height of the medium which has the thermal expansion layer.

SUMMARY

According to one aspect of the present invention, there is provided a simulation method which includes setting a density of a conversion layer which is formed in a medium which has a thermal expansion layer which expands with heat and converts electromagnetic waves into heat, deriving a temperature of the conversion layer which is obtained in a case where the conversion layer which has the set density is irradiated with the electromagnetic waves, executing a simulation relating to heat conduction which takes place in a direction along a surface of the medium in the medium on the basis of a condition which is defined in accordance with the medium and correcting the derived temperature on the basis of a result of execution of the simulation, and deriving an expansion height up to which the medium expands in a case where the medium is heated at the corrected temperature.

According to another aspect of the present invention, there is provided a computer-readable storage medium which controls a simulation device which includes a control unit, making the simulation device execute the following processes of setting a density of a conversion layer which is formed in a medium which has a thermal expansion layer which expands with heat and converts electromagnetic waves into heat, deriving a temperature of the conversion layer which is obtained in a case where the conversion layer which has the set density is irradiated with the electromagnetic waves, executing a simulation relating to heat conduction which takes place in a direction along a surface of the medium in the medium on the basis of a condition which is defined in accordance with the medium and correcting the derived temperature on the basis of a result of execution of the simulation, and deriving an expansion height up to which the medium expands in a case where the medium is heated at the corrected temperature.

According to a further aspect of the present invention, there is provided a simulation device which includes a control unit, in which the control unit executes the following processes of setting a density of a conversion layer which is formed in a medium which has a thermal expansion layer which expands with heat and converts electromagnetic waves into heat, deriving a temperature of the conversion layer which is obtained in a case where the conversion layer which has the set density is irradiated with the electromagnetic waves, executing a simulation relating to heat conduction which takes place in a direction along a surface of the medium in the medium on the basis of a condition which is defined in accordance with the medium and correcting the derived temperature on the basis of a result of execution of the simulation, and deriving an expansion height up to which the medium expands in a case where the medium is heated at the corrected temperature.

BRIEF DESCRIPTION OF DRAWINGS

FIG. 11 is a diagram illustrating one example of heat conduction data which is stored in the simulation device according to the embodiment 1.

FIG. 12 is a diagram illustrating one example of a relation between the temperature and the expansion height of the thermally expandable sheet in the embodiment 1.

FIG. 13 is a diagram illustrating one example that a preview of a state which is obtained after expansion of the thermally expandable sheet is displayed in the embodiment 1.

FIG. 20 is a diagram illustrating one example of two expansion regions which are set on the thermally expandable sheet and are different from each other in size.

FIG. 21 is a diagram illustrating one example of threshold value data which is stored in the simulation device according to the embodiment 2.

FIG. 22 is a diagram illustrating one example of a warning screen which is displayed by the simulation device according to the embodiment 2.

DETAILED DESCRIPTION

Figure 1:
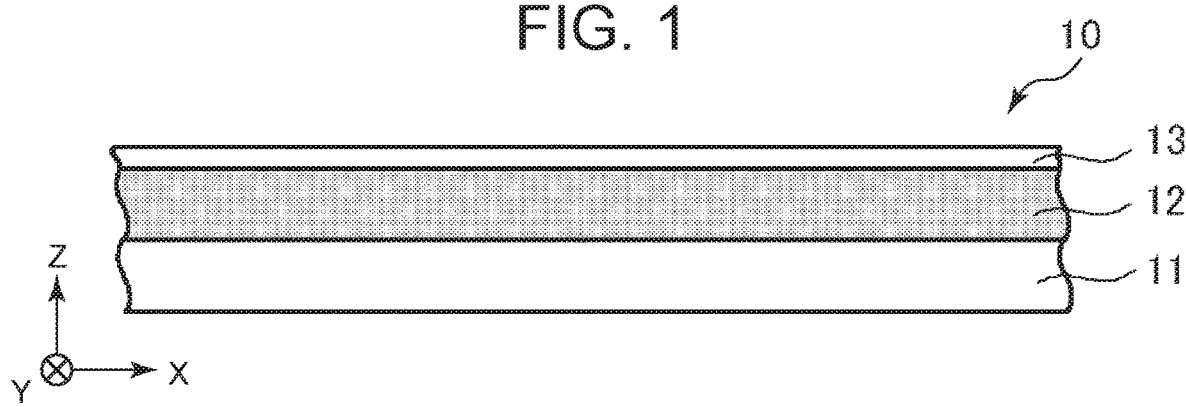
FIG. 1 is a sectional diagram illustrating one example of a thermally expandable sheet according to an embodiment 1 of the present invention.

In the following, embodiments of the present invention will be described with reference to the drawings. Incidentally, in the drawings, the same symbol is assigned to the same part or a corresponding part.

Embodiment 1

<Thermally Expandable Sheet 10>

One example of a sectional configuration of the thermally expandable sheet 10 according to the embodiment 1 of the present invention on which a shaped object is to be formed is illustrated in FIG. 1. The thermally expandable sheet 10 is a medium on which a part which is selected in advance expands with heat and thereby the shaped object is formed. The shaped object is an object having a stereoscopic shape and is formed by expanding a part of a two-dimensional sheet from a surface of the sheet outward (upward in FIG. 1). The shaped object is also called a stereoscopic object or a stereoscopic image. The shape of the shaped object includes a simple shape, a geometric shape, and general shapes such as letters/characters and so forth.

In other words, the shaped object in the embodiment 1 is an object which, in a case of setting a specific 2-dimensional plane in a 3-dimensional space as a reference, has unevenness in a direction which is vertical or diagonal to the 2-dimensional plane. Although such a shaped object is included in the stereoscopic (3-dimensional) image, this shaped object will be called a 2.5-dimensional (2.5D) image or a pseudo 3-dimensional (pseudo-3D) image in order to distinguish this shaped object from the stereoscopic image which is formed by a so-called 3D printer technique. In addition, although a technique of forming such a shaped object is included in a stereoscopic image printing technique, this technique will be called a 2.5-dimensional printing technique or a pseudo 3-dimensional printing technique in order to distinguish this technique from the so-called 3D printer technique.

As illustrated in FIG. 1, the thermally expandable sheet 10 includes a base material 11, a thermal expansion layer 12 and an ink receiving layer 13. Incidentally, FIG. 1 illustrates one example of a section of the thermally expandable sheet 10 in a state obtained before the shaped object is formed, that is, in the state where no part expands. In the following, the ink receiving layer 13 side of the thermally expandable sheet 10 will be called the front side and the base material 11 side thereof will be called the back side.

The base material 11 is a sheet-shaped medium which serves as a base of the thermally expandable sheet 10. The base material 11 is a supporter which supports the thermal expansion layer 12 and the ink receiving layer 13 and plays the part of maintaining strength of the thermally expandable sheet 10. It is possible to use, for example, general printing paper as the base material 11. Otherwise, synthetic paper, cloth such as canvas and so forth and plastic films such as a polypropylene film, a polyethylene terephthalate (PET) film, a polybutylene terephthalate (PBT) film and so forth may be used as the material of the base material 11 and there is no particular limitation to the material to be used.

The thermal expansion layer 12 is a layer which is laminated on the base material 11 and expands by being heated to a temperature which exceeds a predetermined expansion temperature. The thermal expansion layer 12 contains a binder and a thermal expansion agent which is arranged dispersedly in the binder. The binder is a thermoplastic resin such as an ethylene-vinyl acetate polymer, an acrylic polymer and so forth. The thermal expansion agent is, specifically, a thermally expandable microcapsule (micro powder) that a substance which vaporizes at a low boiling point such as propane, butane and so forth is enclosed in an outer shell of the thermoplastic resin and which is about 5 to 50 μm in grain diameter. In a case where the thermal expansion agent is heated to a temperature in a range from, for example, about 80° C. to 120° C., the substance which is enclosed in the outer shell vaporizes and the thermal expansion agent foams and expands with the aid of a pressure which is applied by vaporization. The thermal expansion layer 12 expands in accordance with an amount of heat that the thermal expansion layer 12 absorbs in this way. The thermal expansion agent is also called a foaming agent.

The ink receiving layer 13 is a layer which is laminated on the thermal expansion layer 12 and absorbs and receives ink. The ink receiving layer 13 receives a printing ink which is used in an ink-jet system printer, a printing toner which is used in a laser system printer, an ink for a ballpoint pen or a fountain pen, pencil graphite and so forth. The ink receiving layer 13 is made of a material which is favorable to fix the above-described inks, toner and so forth onto a surface of the thermal expansion layer 12. As the material of the ink receiving layer 13, for example, an ink receiving layer composition which is used in ink jet printing paper may be used.

Incidentally, as illustrated in FIG. 1, an X direction and a Y direction are defined as directions which are parallel with the surface of the thermally expandable sheet 10 and a Z direction is defined as a direction which is vertical to the surface of the thermally expandable sheet 10. The same applies to the following drawings.

Figure 2:
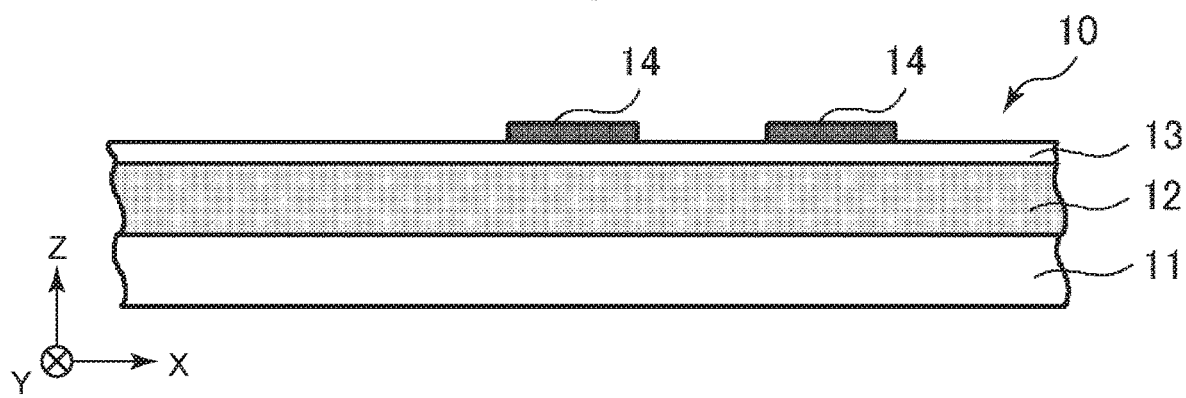
FIG. 2 is a diagram illustrating one example that conversion layers are formed on the thermally expandable sheet which is illustrated in FIG. 1.

A conversion layer 14 which converts electromagnetic waves into heat is formed on a part to be expanded of the front-side face or the back-side face of the thermally expandable sheet 10. As one example, a state where the conversion layers 14 are formed on parts of the front-side face of the thermally expandable sheet 10, that is, a surface of the ink receiving layer 13 is illustrated in FIG. 2.

Figure 3:
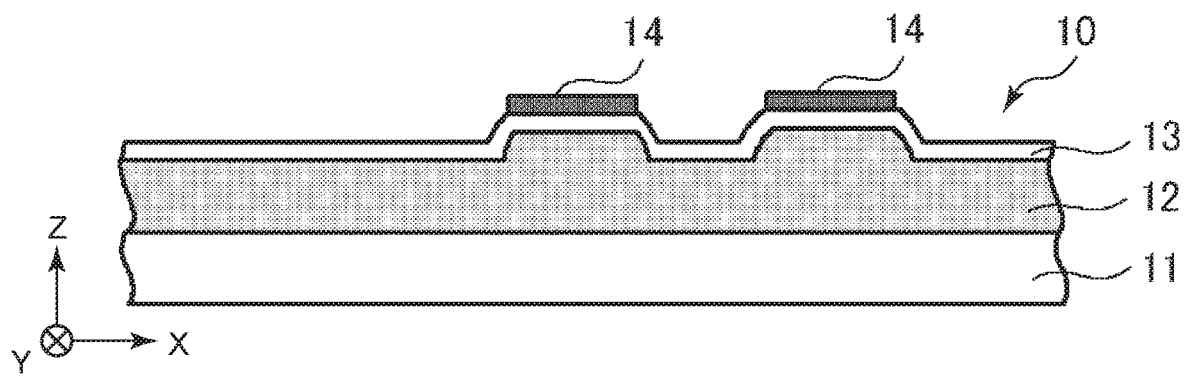
FIG. 3 is a diagram illustrating one example that parts of the thermally expandable sheet which is illustrated in FIG. 2 and on which the conversion layers are formed expand.

The conversion layer 14 is a layer which contains a material which generates heat by absorbing the electromagnetic waves and is made up of ink which contains, for example, carbon molecules. The carbon molecule is contained in black ink (carbon black) or ink of other colors and is one kind of electromagnetic wave-heat conversion materials (exothermic agents) which absorb the electromagnetic waves and convert the electromagnetic waves into heat. The carbon molecule absorbs the electromagnetic waves and generates heat by being subjected to thermal vibration. In a case where a part (two parts in the drawings) of the thermally expandable sheet 10 where the conversion layer 14 which contains the carbon molecules is formed is heated, the thermal expansion layer 12 which is located under the part expands. As a result, in the thermally expandable sheet 10, a part on which the conversion layer 14 is formed swells toward the front-side (+Z direction) and a bump is formed as illustrated in FIG. 3. The shaped object is formed on the thermally expandable sheet 10 by forming a protruded or uneven shape using the bumps of the thermal expansion layer 12 which are formed in this way.

It becomes possible to obtain various shaped objects by combining together a position and an expansion height at which and up to which the thermally expandable sheet 10 is expanded. In addition, an act of expressing a sense of beauty or a sense of quality visually or tactually by shaping (modeling) is called "decoration (ornamentation)".

Incidentally, the thermally expandable sheet 10 which is illustrated in FIG. to FIG. 3 is merely one example and it is possible to use various kinds of the thermally expandable sheets 10 which are mutually different in size, thickness and so forth. Otherwise, the thermally expandable sheet 10 which does not include the ink receiving layer 13 may be used, the thermally expandable sheet 10 which includes a release layer which is releasable on the front side or the back side may be used and the thermally expandable sheet 10 which includes a layer which is made of another optional material may be used.

In addition, the conversion layer 14 may be formed not only on a front-side face of the thermally expandable sheet 10 as illustrated in FIG. 2 but also on a back-side face of the thermally expandable sheet 10, that is, on the base material 11 side-face. A phenomenon that the conversion layer 14 which is formed on the front-side face of the thermally expandable sheet 10 generates heat and thereby the thermally expandable sheet 10 foams and expands is called front-foaming (front-face foaming) and a phenomenon that the conversion layer 14 which is formed on the back-side face of the thermally expandable sheet 10 generates heat and thereby the thermally expandable sheet 10 foams and expands is called back-foaming (back-face foaming).

<Shaping System 1>

Figure 4:
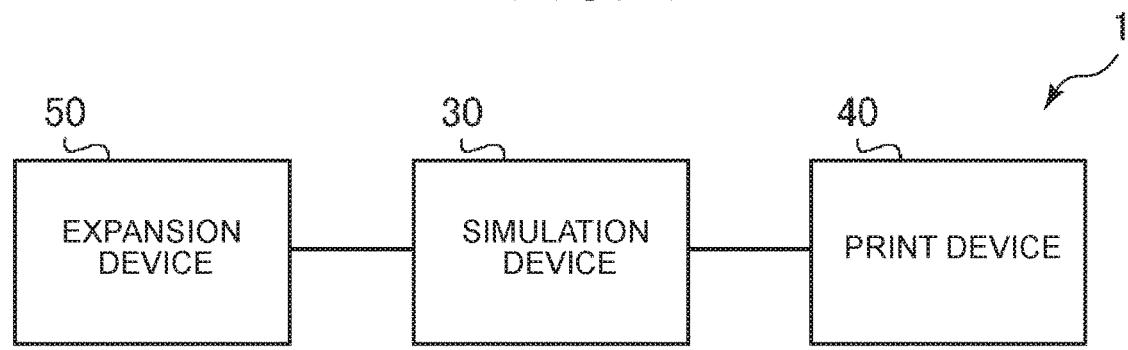
FIG. 4 is a diagram illustrating one example of a schematic configuration of a shaping system according to the embodiment 1.

Next, the shaping system 1 which forms the shaped object on the thermally expandable sheet 10 will be described with reference to FIG. 4. As illustrated in FIG. 4, the shaping system 1 includes a simulation device 30, a print device 10 and an expansion device 50.

<Simulation Device 30>

The simulation device 30 is an information processing device such as a personal computer, a smartphone, a tablet and so forth and has a function of estimating how the thermally expandable sheet 10 expands by a simulation using the expansion device 50. In addition, the simulation device 30 accepts various settings in accordance with a user operation and controls operations of the print device 40 and the expansion device 50.

Figure 5:
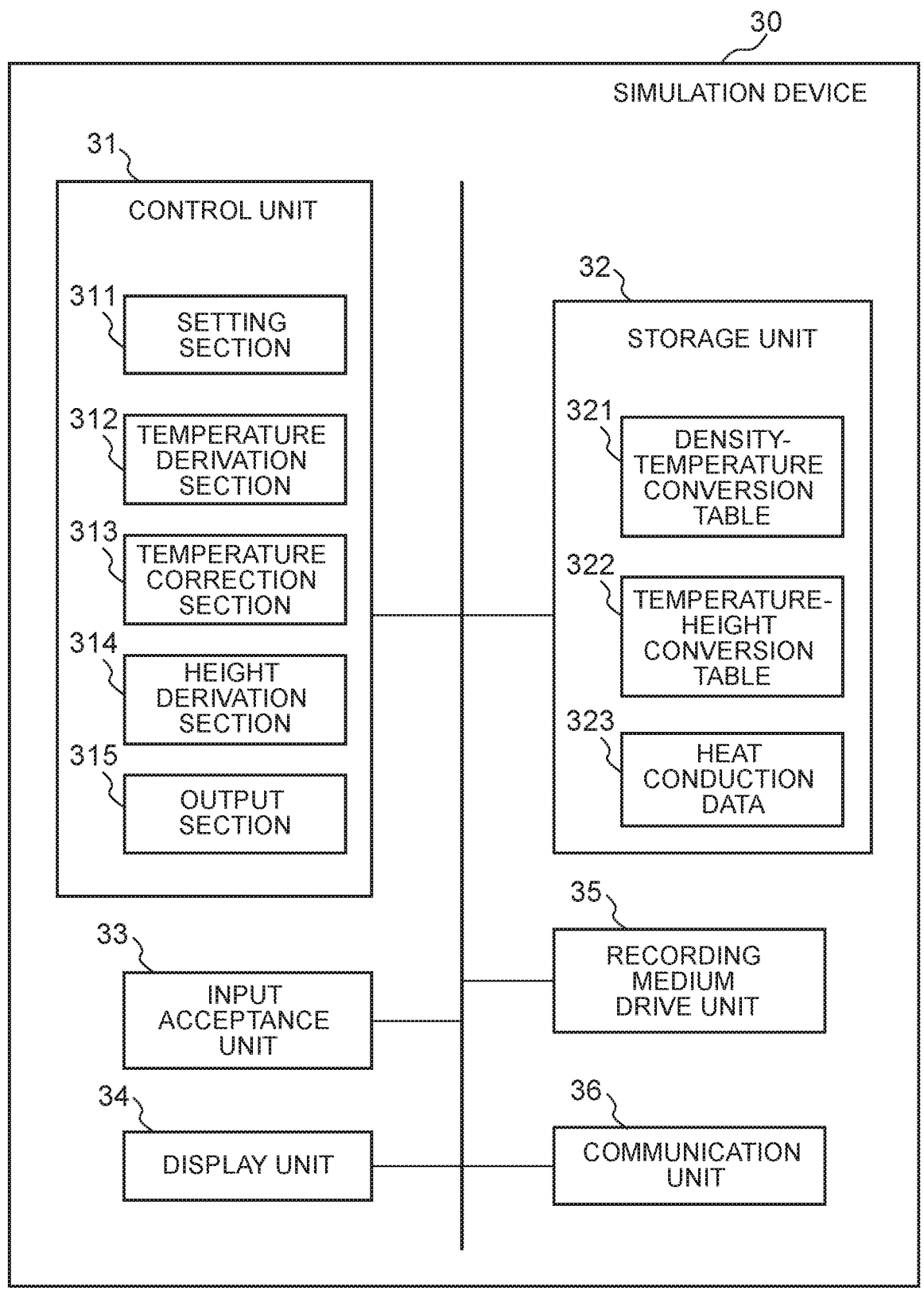
FIG. 5 is a block diagram illustrating one example of a configuration of a simulation device according to the embodiment 1.

One example of a configuration of the simulation device 30 is illustrated in FIG. 5. As illustrated in FIG. 5, the simulation device 30 includes a control unit 31, a storage unit 32, an input acceptance unit 33, a display unit 34, a recording medium drive unit 35 and a communication unit 36. These units are connected together via a bus which is used for signal transmission.

The control unit 31 includes a CPU (Central Processing Unit), a ROM (Read Only Memory) and a RAM (Random Access Memory). The CPU is, for example, a microprocessor and so forth and is a central arithmetic processing unit which executes various kinds of processing and arithmetic operations. In the control unit 31, the CPU reads out a control program which is stored in the ROM and controls the operation of the whole simulation device 30 while using the RAM as a work memory.

The storage unit 32 is a nonvolatile memory such as a flash memory, a hard disc and so forth. The storage unit 32 stores therein a program and data to be executed by the control unit 31. In particular, the storage unit 32 stores therein a density-temperature conversion table 321, a temperature-height conversion table 322 and heat conduction data 323 as illustrated in FIG. 5.

The input acceptance unit 33 includes input devices such as a keyboard, a mouse, a button, a touch pad, a touch panel and so forth and accepts operation input (the user operation) from a user. For example, it becomes possible for the user to set the type of the thermally expandable sheet 10 to be used for forming the shaped object and the position and the density of the conversion layer 14 to be formed on the thermally expandable sheet 10 by operating the input acceptance unit 33.

The display unit 34 includes a display such as a liquid crystal display, an organic EL (Electro Luminescence) display and so forth and displays various images on the basis of control from the control unit 31. For example, the display unit 34 displays a setting screen for formation of the shaped object on the thermally expandable sheet 10 and a result of a simulation which is executed by the simulation device 30.

The recording medium drive unit 35 reads out a program or data which is stored in a portable recording medium. The portable recording medium is a CD (Compact Disc)-ROM, a DVD (Digital Versatile Disc)-ROM, a flash memory which includes a USB (Universal Serial Bus) standard-based connector and so forth. The recording medium drive unit 35 acquires shaping data, for example, by reading the shaping data out of the portable recording medium.

The communication unit 36 includes an interface which is used for communication with external devices including the print device 40 and the expansion device 50. The simulation device 30 is connected with the print device 40 and the expansion device 50 via a wired line such as a flexible cable, a wired LAN (Local Area Network) and so forth or a wireless line such as a wireless LAN, a Bluetooth (a registered trademark)-based line and so forth. The communication unit 36 communicates with the print device 40, the expansion device 50 and other external devices in accordance with at least one of the above-described communication standards on the basis of control from the control unit 31.

The control unit 31 functionally includes a setting section 311, a temperature derivation section 312, a temperature correction section 313, a height derivation section 314 and an output section 315 as illustrated in FIG. 5. In the control unit 31, the CPU reads out the control program which is stored in the ROM to the RAM, executes the control program and controls the operation of the whole simulation device 30.

The setting section 311 sets information which would become necessary for formation of the shaped object by expanding the thermally expandable sheet 10. For example, the setting section 311 sets the type of the thermally expandable sheet 10. The user is able to set the type of the thermally expandable sheet 10 to be used for formation of a desirable shaped object by operating the input acceptance unit 33. The setting section 311 sets the type of the thermally expandable sheet 10 in accordance with the input which is accepted from the user. In addition, the setting section 311 sets whether the front-foaming or the-back foaming is to be executed or both the front-foaming and the back-foaming are to be executed as a process for expanding the thermally expandable sheet 10 in accordance with the input which is accepted from the user.

Further, the setting section 311 sets the density of the conversion layer 14 to be formed on the thermally expandable sheet 10. The higher the density of the conversion layer 14 is, the larger a heating value of the conversion layer 14 per a unit area in a case where the thermally expandable sheet 10 is irradiated with a predetermined amount of the electromagnetic waves becomes. Therefore, the thermally expandable sheet 10 expands more largely. Accordingly, the setting section 311 sets the density of the conversion layer 14 in accordance with an extent up to which the thermally expandable sheet 10 is to be expanded.

Figure 6:
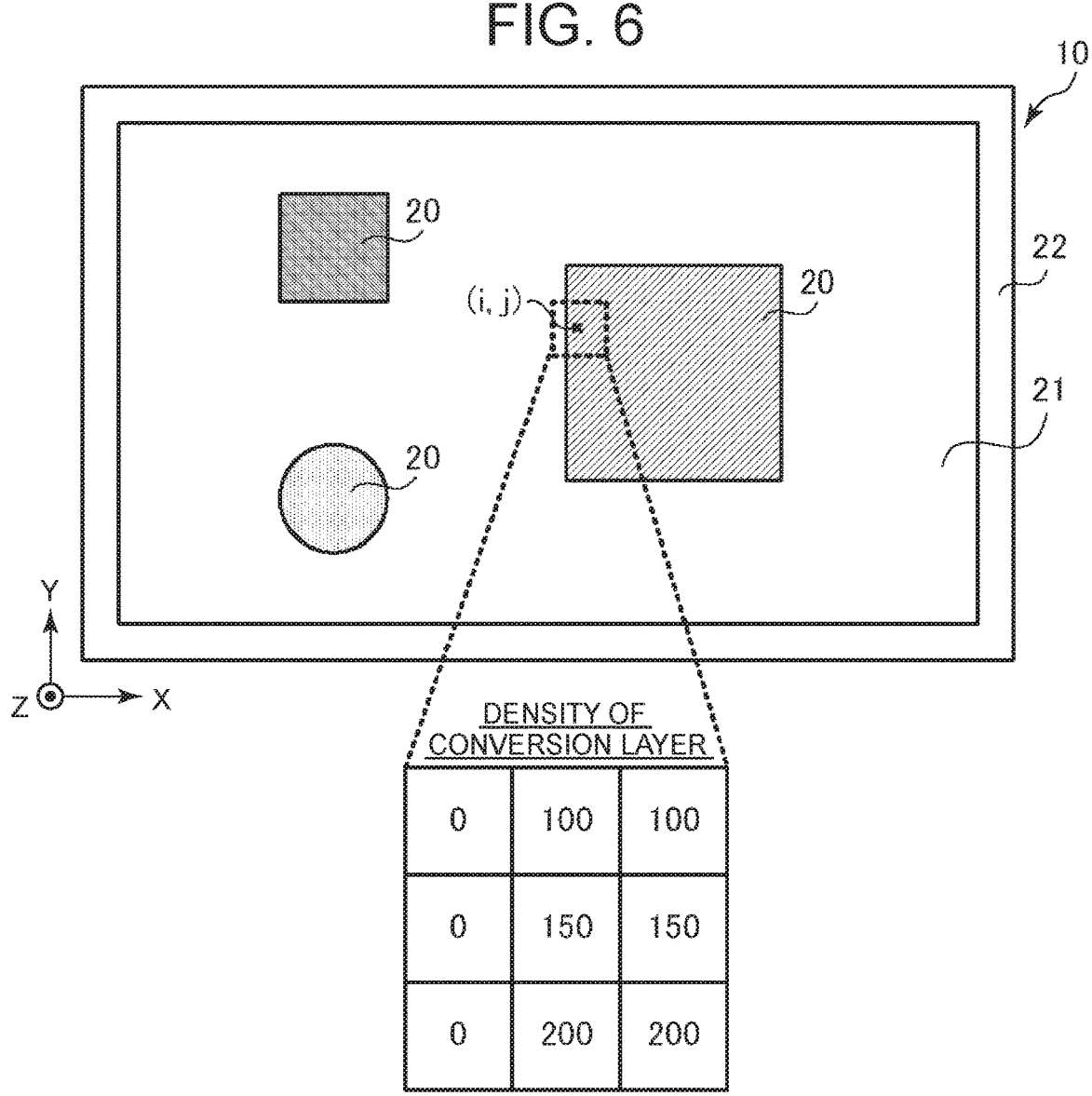
FIG. 6 is a diagram illustrating one example that respective densities of one conversion layer to be formed on the thermally expandable sheet are set in the embodiment 1.

One example that the density of the conversion layer 14 is set on the thermally expandable sheet 10 is illustrated in FIG. 6. The setting section 311 sets the position and the density of the conversion layer 14 to be formed on the thermally expandable sheet 10 by the print device 40 in accordance with the input which is accepted from the user by the input acceptance unit 33, for example, as illustrated in FIG. 6.

Specifically describing, the setting section 311 divides a region other than a margin region 22 which is located on an outer edge of the thermally expandable sheet 10 into an expansion region 20 which is a region to be expanded and a non-expansion region 21 which is a region which is not to be expanded. Then, the setting section 311 sets the density of the conversion layer 14 to a higher-value density (a darker color, that is, a color which is closer to black in FIG. 6) for a part which is to be more largely expanded in the expansion region 20. On the other hand, the setting section 311 sets densities of the conversion layers 14 in the non-expansion region 21 and the margin region 22 to zeros (white in FIG. 6). Incidentally, the margin region 22 is a region which is prepared so as to make it possible to accurately calculate heat conduction in the thermally expandable sheet 10 up to a position which is close the outer edge of the thermally expandable sheet 10.

Describing in more detail, the setting section 311 sets the densities of the conversion layer 14 at the plurality of positions on the thermally expandable sheet 10. Accordingly, the setting section 311 divides the region which includes also the margin region 22 on the thermally expandable sheet 10 into I regions in the X direction and J regions in the Y direction, that is, I×J regions in total. The setting section 311 sets the density of the conversion layer 14 in each of the I×J regions.

Here, the density of the conversion layer 14 is set also in the margin region 22 for the reason of making it possible to simulate a state where heat escapes to the outside through the outer edge of the thermally expandable sheet 10 in a case of simulating the heat conduction in the direction along the surface of the thermally expandable sheet 10 in the thermally expandable sheet 10 which will be described later.

One example of the densities which are set to 3×3, that is, nine positions in total with a position (i, j) being set at the center in a partial region (a region which is surrounded by a broken line in FIG. 6) on the thermally expandable sheet 10 is illustrated under FIG. 6. Specifically, the example of the densities which are set to the nine positions which are set striding over the expansion region 20 and the non-expansion region 21 on the thermally expandable sheet 10 is illustrated under FIG. 6.

As illustrated in FIG. 6, the setting section 311 sets the density of the non-expansion region 21, that is, the density of each position where the conversion layer 14 is not to be formed to zero. Then, the setting section 311 sets the density of the expansion region 20, that is, the density of each position where the conversion layer 14 is to be formed to a value which gets larger as the density becomes higher. The setting section 311 sets the densities of the conversion layer 14 at the plurality of positions of I×J regions which are so divided on the thermally expandable sheet 10, for example, in 256 gradations from 0 to 255.

Incidentally, fineness of the I×J regions to which the densities of the conversion layer 14 are set, that is, an interval (a resolution) among the respective positions is defined in accordance with an accuracy of the bump which is formed by expansion of the thermally expandable sheet 10. Specifically describing, the interval among the plurality of positions of the I×J regions which are so divided to a value which is less than a minimum value of a width of the bump whose formation is made possible by expansion of the thermally expandable sheet 10 in a direction (that is, a direction which is parallel with an XY plane) along the surface of the thermally expandable sheet 10 by taking a theorem of sampling into consideration. For example, in a case where the minimum value of the width of the bump whose formation is made possible by expansion of the thermally expandable sheet 10 is 0.5 mm, the interval among the plurality of positions to which the densities are set is defined to 0.2 mm which is smaller than half of 0.5 mm. In other words, the densities of the conversion layer 14 are set at intervals of 0.2 mm in the X direction and the Y direction on the thermally expandable sheet 10.

The setting section 311 sets the density of the conversion layer 14 which is formed at each position on the thermally expandable sheet 10 in accordance with the input which is accepted from the user in this way. The setting section 311 is realized by cooperation of the control unit 31 with the input acceptance unit 33.

Incidentally, in a case of executing both the front-foaming and the back-foaming, the setting section 311 sets the density of the conversion layer 14 at each position on the thermally expandable sheet 10 onto each of a front-side face and a back-side face of the thermally expandable sheet 10. On the other hand, in a case of executing either the front-foaming or the back-foaming, the setting section 311 sets the density of the conversion layer 14 at each position on the thermally expandable sheet 10 only onto either the front-side face or the back-side face of the thermally expandable sheet 10.

As illustrated in FIG. 5, the temperature derivation section 312 derives the temperature of the conversion layer 14 which is obtained in a case where the conversion layer 14 of the density which is set by the setting section 311 is irradiated with the electromagnetic waves. The temperature derivation section 312 refers to the density-temperature conversion table 321 which is stored in the storage unit 32 in order to derive the temperature which corresponds to the density which is set by the setting section 311. The density-temperature conversion table 321 is a table that a corresponding relation between each density of the conversion layer 14 and each temperature of the conversion layer 14 which is obtained in a case where the conversion layer 14 which is set to that density is irradiated with the electromagnetic waves by the expansion device 50 is defined in advance.

Figure 7:
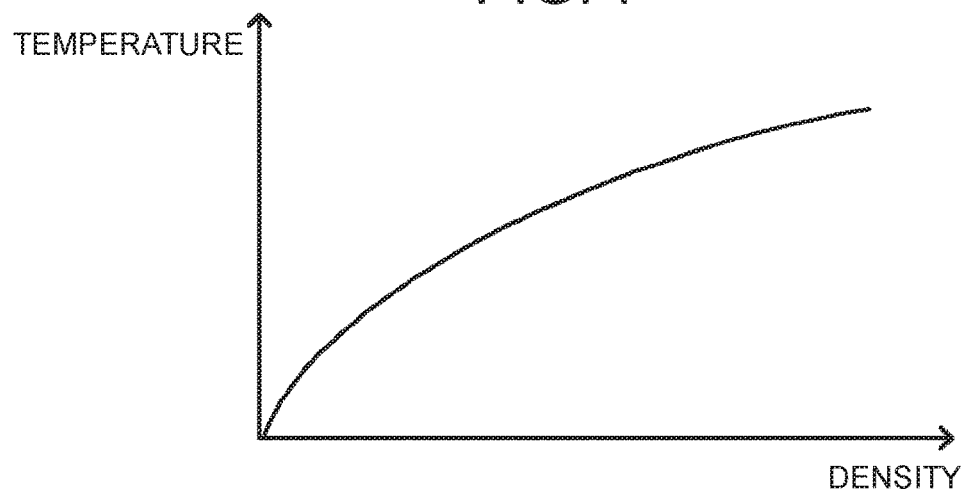
FIG. 7 is a diagram illustrating one example of a relation between the density and a temperature of one conversion layer in the embodiment 1.

One example of the corresponding relation between each density and each temperature of the conversion layer 14 which is defined in the density-temperature conversion table 321 is illustrated in FIG. 7. As illustrated in FIG. 7, since the higher the density of the conversion layer 14 becomes, the more the conversion layer 14 generates heat in a case where the conversion layer 14 which is set to that density is irradiated with a predetermined amount of the electromagnetic waves, the temperature of the conversion layer 14 is more increased. The temperature derivation section 312 calculates the corresponding temperature from the density of the conversion layer 14 which is set at each of the plurality of positions on the thermally expandable sheet 10 on the basis of the corresponding relation between each density and each temperature like this.

Figure 8:
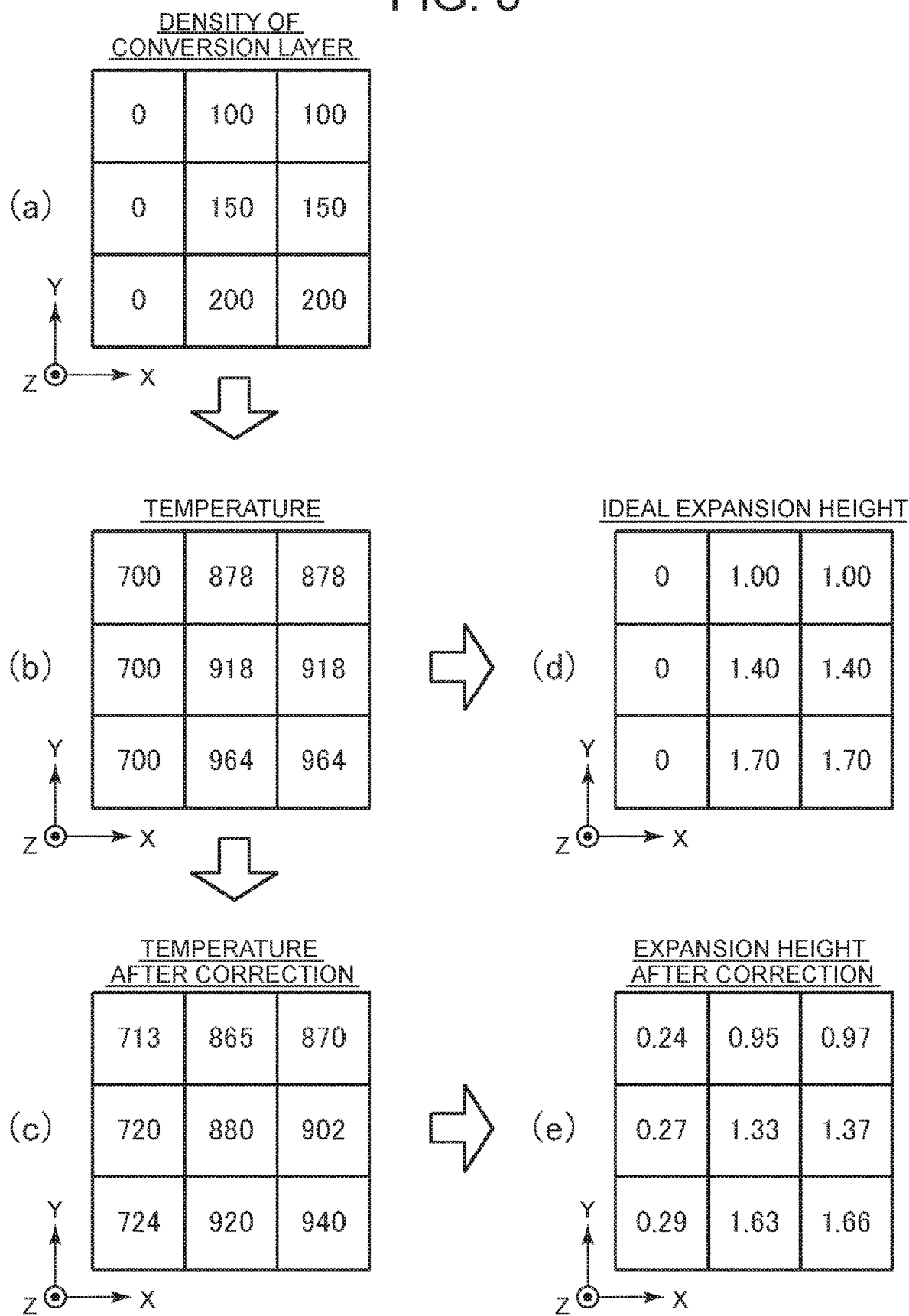
FIG. 8 is a diagram illustrating examples (a) of the densities of the conversion layer which are set in a partial region on the thermally expandable sheet in the embodiment 1; (b) of temperatures which respectively correspond to the densities illustrated in (a); (c) that the temperatures which are illustrated in (b) are corrected by taking heat conduction to the surroundings into consideration; (d) of expansion heights which respectively correspond to the temperatures which are illustrated in (b); and (e) of the expansion heights which respectively correspond to corrected temperatures which are illustrated in (c).

The temperature derivation section 312 calculates the corresponding temperature from the density of the conversion layer 14 which is set by the setting section 311 in regard to each of the plurality of positions (1,1) to (I, J) on the thermally expandable sheet 10. Examples that the corresponding temperatures are calculated from the densities of the conversion layer 14 which are set at the nine positions which are illustrated in FIG. 6 are specifically illustrated in sections (a) and (b) of FIG. 8. Here, each of the values of the temperatures in section (b) of FIG. 8 is a value which is obtained by multiplying a value of a temperature which is expressed in centigrade by a constant (for example, ten times).

The temperature derivation section 312 calculates a value which corresponds to a lower temperature as a temperature at a position that the density is set to zero and calculates a higher value as a corresponding temperature for a position which is set to a higher density on the basis of the corresponding relation between each density and each temperature which is illustrated in FIG. 7. As a result, the values of the temperature which are indicated in section (b) of FIG. 8 are derived from the values of the density at the respective positions which are indicated in section (a) of FIG. 8.

Figure 9A:
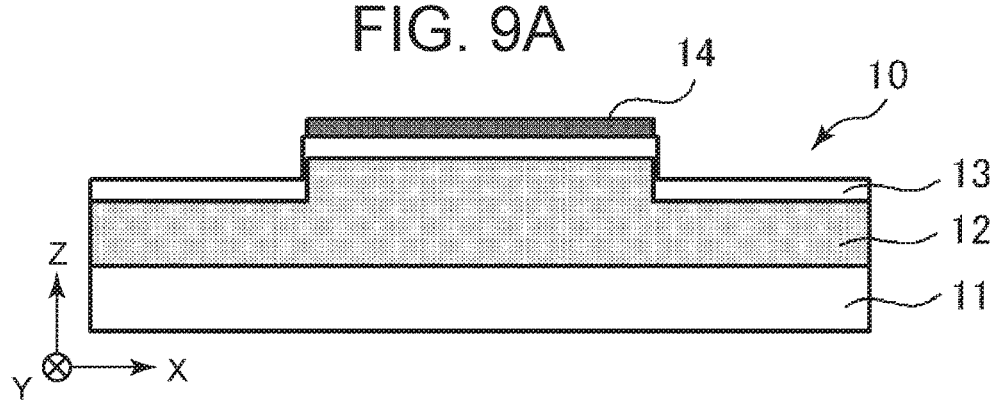
FIG. 9A is a diagram illustrating one example of a state where the thermally expandable sheet expands in an ideal situation that heat conduction does not occur.
Figure 9B:
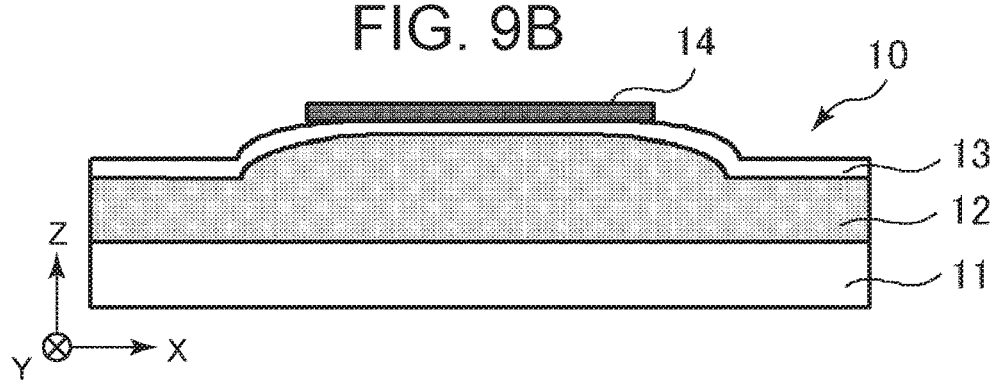
FIG. 9B is a diagram illustrating one example of a state where the thermally expandable sheet expands in an actual situation that the heat conduction occurs.

As illustrated in FIG. 5, the temperature correction section 313 corrects each temperature which is derived by the temperature derivation section 312 on the basis of the temperatures of the surroundings on the thermally expandable sheet 10. In a case where the thermally expandable sheet 10 is irradiated with the electromagnetic waves, a part of the thermally expandable sheet 10 on which the conversion layer 14 is formed expands. An enlarged diagram of a part on which the conversion layer 14 is formed is illustrated in each of FIG. 9A and FIG. 9B. In a case where the thermally expandable sheet 10 expands, ideally, the part on which the conversion layer 14 is formed expands vertically and a part on which the conversion layer 14 is not formed does not expand and thereby a sharp edge is formed between the expansion area 20 and the non-expansion area 21 as illustrated in FIG. 9A. However, in actuality, since heat moves in the thermally expandable sheet 10 by heat conduction, the heat which is generated in the conversion layer 14 is diffused also to the part on which the conversion layer 14 is not formed. Therefore, in actuality, a boundary between the expansion area 20 and the non-expansion area 21 becomes gentle as illustrated in FIG. 9B.

The temperature correction section 313 executes a simulation which relates to heat conduction in the direction (that is, the direction which is parallel with the XY plane) along the surface of the thermally expandable sheet 10 in the thermally expandable sheet 10. Thereby, the temperature correction section 313 estimates an actual temperature distribution on the thermally expandable sheet 10 which is observed in a case where the conversion layer 14 which is formed so as to have the density which is set by the setting section 311 is irradiated with the electromagnetic waves.

Specifically describing, the temperature correction section 313 executes the simulation relating to heat conduction on the basis of conditions which are defined in advance. The conditions for the simulation are defined on the basis of the temperature differences among the plurality of positions (1, 1) to (I, J) on the thermally expandable sheet 10 and a heat conduction coefficient which is defined in accordance with the thermally expandable sheet 10. That is, the temperature correction section 313 executes the simulation relating to heat conduction on the basis of the temperature differences between each temperature which is derived by the temperature derivation section 312 and the temperatures of the surroundings and the heat conduction coefficient. Then, the temperature correction section 313 corrects the temperature which is derived by the temperature derivation section 312 on the basis of a result of execution of the simulation.

Describing in more detail, the temperature correction section 313 corrects the temperature which is derived by the temperature derivation section 312 on the basis of the temperature differences between each position on the thermally expandable sheet 10 and the eight (see, FIG. 6) adjacent positions which are adjacent to each position in regard to each of the plurality of positions (1, 1) to (I, J) on the thermally expandable sheet 10. Firstly, the temperature correction section 313 calculates an accumulated value ΔT of the temperature differences between the temperature which is derived by the temperature derivation section 312 and temperatures of the surroundings. In a case where the temperature at the position (i, j) which is derived by the temperature derivation section 312 is expressed as T(i, j), the temperature correction section 313 calculates the accumulated value ΔT(i, j) of the temperature differences obtained at the position (i, j) in accordance with the following formula (1).

$$\Delta T(i,j) = \{T(i-1,j)-T(i,j)\} + \{(T(i+1,j)-T(i,j)\} + \{T(i,j-1)-T(i,j)\} + \{T(i,j+1)-T(i,j)\} + \{T(i-1,j-1)-T(i,j)\} + \{T(i-1,j+1)-T(i,j)\} + \{T(i+1,j-1)-T(i,j)\} + \{T(i+1,j+1)-T(i,j)\} \quad (1)$$

Specifically describing, the temperature correction section 313 calculates the temperature difference between the position (i, j) on the thermally expandable sheet 10 and each of the eight surrounding adjacent positions, that is, two positions (i−1, j) and (i+1, j) which are adjacent to the position (i, j) in a transverse direction (the X direction), two positions (i, j−1) and (i, j+1) which are adjacent to the position (i, j) in a longitudinal direction (the Y direction) and four positions (i−1, j−1), (i−1, j+1), (i+1, j−1) and (i+1, j+1) which are adjacent to the position (i, j) in diagonal directions. Then, the temperature correction section 313 calculates the sum of the temperature differences between the position (i, j) and the eight surrounding and adjacent positions and thereby calculates the accumulated value ΔT(i, j) of the temperature differences at the position (i, j).

Figure 10:
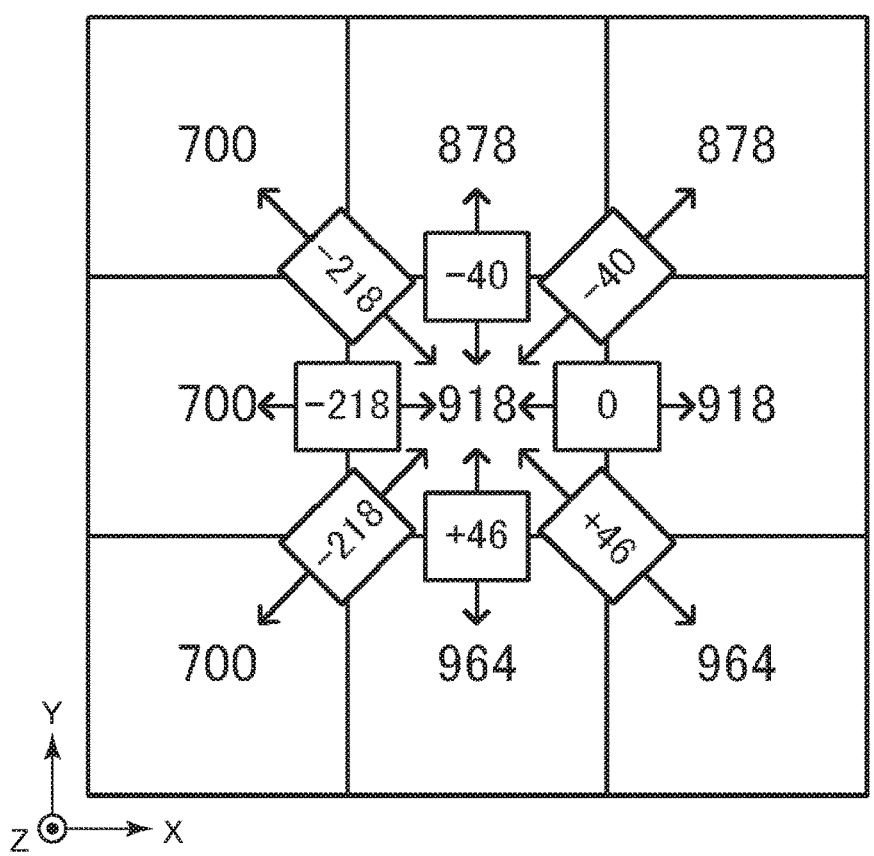
FIG. 10 is a diagram illustrating one example of derivation of a difference in temperature between adjacent positions on the thermally expandable sheet in the embodiment 1.

For example, in a case where the temperatures at the nine positions are distributed as illustrated in section (b) of FIG. 8 with the position (i, j) being set at the center, the temperature correction section 313 calculates the temperature difference between the central position and each of the eight surrounding positions, adds together the calculated temperature differences and thereby calculates the accumulated value ΔT(i, j) as illustrated in FIG. 10. Incidentally, in FIG. 10, figures on arrows indicate difference values between the central position and the surrounding positions. In the example illustrated in FIG. 10, a value "−642" is obtained as the accumulated value ΔT(i, j) of the temperature differences as indicated in the following formula (2).

$$\Delta T(i,j) = (700-918) + (918-918) + (964-918) + (878-918) + (700-918) + (700-918) + (878-918) + (964-918) = -218 + 0 + 46 - 40 - 218 - 218 - 40 + 46 = -642 \quad (2)$$

The temperature correction section 313 calculates the accumulated value ΔT of such temperature differences in regard to each of the plurality of positions (1, 1) to (I, J) which is set on the thermally expandable sheet 10. Thereby, the temperature correction section 313 obtains accumulated values ΔT(1, 1) to ΔT(I, J) of the temperature differences at the plurality of positions (1, 1) to (I, J).

The temperature correction section 313 calculates the accumulated value ΔT(i, j) of the temperature differences in this way and then secondly corrects the temperature which is derived by the temperature derivation section 312 by using the calculated accumulated value ΔT(i, j) and a heat conduction coefficient. In a case where the heat conduction coefficient is denoted by k, the temperature correction section 313 calculates a temperature T'(i, j) which is obtained after correction at the position (i, j) in accordance with the following formula (3).

$$T'(i,j) = T(i,j) + \Delta T(i,j)/k \quad (3)$$

Specifically describing, the temperature correction section 313 adds a value which is obtained by dividing the accumulated value ΔT(i, j) of the temperature differences by the heat conduction coefficient k to the temperature T(i, j) which is derived by the temperature derivation section 312. For example, in a case where the value of the heat conduction coefficient k is 30 and the value of the accumulated value ΔT(i, j) of the temperature differences is "−642" as calculated in accordance with the above-described formula (2), "897" is obtained as a value of the corrected temperature T'(i, j) which is obtained after correction as indicated in the following formula (4). Accordingly, the temperature correction section 313 corrects the temperature at the position (i, j) from the value "918" which is derived by the temperature derivation section 312 to "897". In other words, the temperature correction section 313 estimates that the temperature at the position (i, j) would be lowered because heat escapes to the surroundings.

$$T'(i,j) = 918 + (-642)/30 \approx 897 \quad (4)$$

Here, the heat conduction coefficient k is an index value which indicates difficulty in heat conducting in the thermally expandable sheet 10 and the more heat conduction in the thermally expandable sheet 10 becomes difficult, the larger the value of the heat conduction coefficient k becomes. The heat conduction coefficient k is defined in advance in the heat conduction data 323 which is stored in the storage unit 32. One example of the heat conduction data 323 is illustrated in FIG. 11. As illustrated in FIG. 11, in the heat conduction data 323, values which are made different from one another depending on different types of the thermally expandable sheets 10 such as, for example, a sheet A, a sheet B, a sheet C and so forth are defined as the heat conduction coefficient k. That is, the condition for the simulation is defined so as to differ depending on the type of the thermally expandable sheet 10.

The type of the thermally expandable sheet 10 is determined depending on differences in material, thickness and so forth of a layer which is included in the thermally expandable sheet 10. The heat which is generated by irradiating the conversion layer 14 with the electromagnetic waves is diffused by being conducted to each of a plurality of layers which are included in the thermally expandable sheet 10. Easiness and difficulty in heat conduction on that occasion depend on the material, the thickness and so forth of each layer. For example, in a case where the conversion layer 14 is formed on the front-side face of the thermally expandable sheet 10, a way that the heat which is generated in the conversion layer 14 spreads to the surroundings greatly depends on the material, the thickness and so forth of the ink receiving layer 13. Specifically, the more easily the material of the layer which is included in the thermally expandable sheet 10 conducts heat, the more easily the heat spreads to the surroundings in the thermally expandable sheet 10, and the more hardly the material of the layer included in the thermally expandable sheet 10 conducts heat, the more hardly the heat spreads to the surroundings in the thermally expandable sheet 10. In addition, the thicker the thickness of the layer which is made of the material which conducts heat more easily is, the more easily the heat spreads to the surroundings in the thermally expandable sheet 10, and the thinner the thickness of the layer which is made of the material which conducts the heat more hardly is, the more easily the heat spreads to the surroundings in the thermally expandable sheet 10.

Describing in more detail, on the other hand, in a case where the conversion layer 14 is formed on the back-side face of the thermally expandable sheet 10, the way that heat which is generated in the conversion layer 14 spreads to the surroundings greatly depends on the material, the thickness and so forth of the base material 11. In addition, the way of heat conduction in the thermally expandable sheet 10 varies also depending on whether the thermally expandable sheet 10 includes the ink receiving layer 13, whether the thermally expandable sheet 10 includes a layer other than the base material 11, the thermal expansion layer 12 and the ink receiving layer 13 and so forth.

In addition, as illustrated in FIG. 11, in the heat conduction data 323, the heat conduction coefficient is set to different values between a case where the conversion layer 14 is formed on the front-side face of the thermally expandable sheet 10 and a case where the conversion layer 14 is formed on the back-side face of the thermally expandable sheet 10. That is, the condition for the simulation is defined so as to differ depending on whether the conversion layer 14 is formed on the front-side face or the back-side face of the thermally expandable sheet 10.

This is because the way that the heat which is generated in the conversion layer 14 spreads to the surroundings differs between the case where the conversion layer 14 is formed on the front-side face and the case where the conversion layer 14 is formed the back-side face of the thermally expandable sheet 10. In general, the heat spreads to the surroundings more easily in the case where the heat is conducted over the distance from the back side to the front side than in the case where the conversion layer 14 is formed on the front-side face of the thermally expandable sheet 10. Therefore, in the case where the conversion layer 14 is formed on the back-side face of the thermally expandable sheet 10, the heat conduction coefficient k is defined to a value which is small in comparison with a value which is defined in the case where the conversion layer 14 is formed on the front-side face of the thermally expandable sheet 10.

The temperature correction section 313 selects one heat conduction coefficient k to be used from the plurality of heat conduction coefficients k which is defined in the heat conduction data 323 depending on the type of the thermally expandable sheet 10 to be used and on which face the conversion layer 14 is to be formed between the front-side face and the back-side face of the thermally expandable sheet 10. Then, the temperature correction section 313 corrects the temperature at each position on the thermally expandable sheet 10 by using the selected heat conduction coefficient k.

Further, the temperature correction section 313 repetitively executes a process for further correcting the temperature which is obtained at each position and is corrected on the basis of the temperature differences between each position and the positions which are adjacent to each position on the thermally expandable sheet 10 further on the basis of the temperature differences between each position and the positions which are adjacent to each position which are obtained after correction the number of times which is designated in advance. In the temperature correcting process which is executed one time on the basis of the temperature differences between each position and the eight surrounding positions which are adjacent to each position in the transverse, longitudinal and diagonal directions as described above, consideration of the heat conduction in the thermally expandable sheet 10 is limited to the heat conduction between each position and each of the adjacent positions. However, in reality, the heat in the thermally expandable sheet 10 is conducted not only to the adjacent positions but to a wider range. Therefore, the temperature correction section 313 simulates a situation where the heat is conducted to the wider range by repetitively executing the temperature correcting process the plurality of times.

Specifically describing, the temperature correction section 313 substitutes the corrected temperature T'(i, j) which is obtained by execution of the temperature correcting process which is based on the temperature differences between each position and the adjacent positions for the temperature T(i, j) in the above-described formulae (1) and (3) in regard to each of the plurality of positions (1, 1) to (I, J) on the thermally expandable sheet 10. Thereby, the temperature T'(i, j) on which the temperature correcting process is executed two times is obtained on the basis of the temperature T(i, j) on which the temperature correcting process is executed one time.

The temperature correction section 313 estimates the heat conduction to the wider range in the thermally expandable sheet 10 by executing the temperature correcting process which is based on the temperature differences between each position and the adjacent positions th of times which is designated in advance in this way. As the number of times that the temperature correcting process is executed is increased, it becomes possible to simulate a situation where the heat is conducted to a wider range. Incidentally, the number of times that the temperature correcting process is executed may be designated by the user or a default value may be set in advance for the number of times.

One example that the temperatures at the nine positions which are illustrated in section (b) of FIG. 8 with the position (i, j) being set at the center are corrected by the temperature correction section 313 is illustrated in section (c) of FIG. 8. As illustrated in, sections (c) and (b) of FIG. 8 the temperature of a part which is higher in temperature than the surroundings is reduced because the heat escapes to the surroundings and the temperature of a part which is lower in temperature than the surroundings is increased because the part absorbs heat from the surroundings. A temperature distribution which is illustrated in section (c) of FIG. 8 becomes gentle in comparison with a temperature distribution in section (b) of FIG. 8 because the temperature is corrected by the temperature correction section 313 by taking heat conduction to the surroundings into consideration in this way.

As illustrated in FIG. 5, the height derivation section 314 derives the expansion height up to which the thermally expandable sheet 10 would expand in a case where the thermally expandable sheet 10 is heated at the temperature which is corrected by the temperature correction section 313. Here, the expansion height is a height of the bump which is formed in a case where the thermally expandable sheet 10 is heated and expands. The height derivation section 314 refers to the temperature-height conversion table 322 which is stored in the storage unit 32 in order to derive the expansion height from the temperature which is corrected by the temperature correction section 313. The temperature-height conversion table 322 is a table that a corresponding relation between each temperature of the conversion layer 14 and each expansion height up to which the thermally expandable sheet 10 expands in a case where the thermally expandable sheet 10 is heated at that temperature is defined in advance.

One example of the corresponding relation between each temperature and each expansion height of the thermally expandable sheet 10 is illustrated in FIG. 12. As illustrated in FIG. 12, since the more the temperature of the thermally expandable sheet 10 is increased, the more the heat expansion agent which is contained in the thermal expansion layer 12 expands, the expansion height of the thermally expandable sheet 10 is more increased. The height derivation section 314 calculates the corresponding expansion height from the temperature which is corrected by the temperature correction section 313 on the basis of the corresponding relation between each temperature and each expansion height of the thermally extendable sheet 10 like this.

The height derivation section 314 calculates the corresponding expansion height from the temperature which is corrected by the temperature correction section 313 in regard to each of the plurality of positions (1, 1) to (I, J) on the thermally expandable sheet 10. One example that the corresponding expansion height is calculated from the temperature which is corrected by the temperature correction section 313 at each of the nine positions illustrated in section (c) of FIG. 8 is specifically illustrated in section (e) of FIG. 8. The height derivation section 314 calculates a higher value as the expansion height for a position which is higher in temperature on the basis of the corresponding relation between each temperature and each expansion height which is illustrated in FIG. 12. As a result, the values of the expansion height which are indicated in section (e) of FIG. 8 are derived from the values of the temperature at the respective positions which are indicated in section (c) of FIG. 8.

One example that the corresponding expansion height is derived from the temperature which is obtained before being corrected by the temperature correction section 313 at each of the nine positions in section (b) of FIG. 8 on the basis of the temperature-height conversion table 322 is illustrated in section (d) of FIG. 8 for comparison. In the example in section (d) of FIG. 8, since the temperature is not corrected, the expansion height of the non-expansion region 21 in which the conversion layer 14 is not formed is derived as zero. Therefore, a large difference in expansion height is made between the expansion region 20 and the non-expansion region 21.

On the other hand, since in the example illustrated in section (e) of FIG. 8, the temperature is corrected by taking the heat conduction into consideration, even the non-expansion region 21 expands up to a height of some extent and, on the other hand, the expansion height of the expansion region 20 is slightly reduced in comparison with the expansion height which is obtained before correction. Therefore, a difference in expansion height between the expansion region 20 and the non-expansion region 21 is slightly reduced in comparison with the difference in section (d) of FIG. 8. It becomes possible to estimate the expansion height which is closer to the actual height at each position on the thermally expandable sheet 10 by correcting the temperature by taking heat conduction in the thermally expandable sheet 10 into consideration in this way.

As illustrated in FIG. 5, the output section 315 outputs a result which is obtained by executing simulation processing by the simulation device 30. Specifically describing, the output section 315 generates an image which expresses a state where each position on the thermally expandable sheet 10 expands up to the expansion height which is derived by the height derivation section 314 in a simulative manner. Then, the output section 315 displays a preview of the generated image on the display unit 34.

One example that the preview of the state of the thermally expandable sheet 10 which is obtained after expansion is displayed is illustrated in FIG. 13. With this preview display, the user becomes able to confirm an after-expansion state of the thermally expandable sheet 10 on which the conversion layers 14 are formed on the basis of current setting. In other words, it becomes possible for the user to confirm whether a desirable shaped object would be obtained before actually expanding the thermally expandable sheet 10.

In a case where the user decides that acquisition of the desirable modeled object is possible as a result of confirmation of the preview display, the user becomes able to input an instruction to form the conversion layer 14 on the thermally expandable sheet 10 on the basis of the current setting and execute an expansion process via the input acceptance unit 33. On the other hand, in a case where the user decides that acquisition of the desirable modeled object is not possible, the user becomes able to set again the position or the density at/with which the conversion layer 14 is to be formed.

In a case where the instruction to form the conversion layer 14 is input from the user, the output section 315 outputs print data to the print device 40. The print data is data which indicates the position and the density of the conversion layer 14 which is to be formed on the front-side face or the back-side face of the thermally expandable sheet 10. The output section 315 communicates with the print device 40 via the communication unit 36 and transmits the print data to the print device 40. Then, the output section 315 makes the print device 40 execute printing in accordance with the print data which is transmitted to the print device 40 and thereby makes the print device 40 form the conversion layer 14 on the front-side face or the back-side face of the thermally expandable sheet 10. The output section 315 is realized by cooperation of the control section 31 with the display unit 34 and the communication unit 36.

<Print Device 40>

The print device 40 is a print unit which prints an image on the thermally expandable sheet 10. The print device 40 forms the conversion layer 14 of the density which is set by the simulation device 30 on the front-side face or the back-side face of the thermally expandable sheet 10. The print device 40 is, for example, an ink jet printer which prints the image by a system of forming ink into extremely fine droplets and directly spraying the ink droplets to a medium to be printed.

Figure 14:
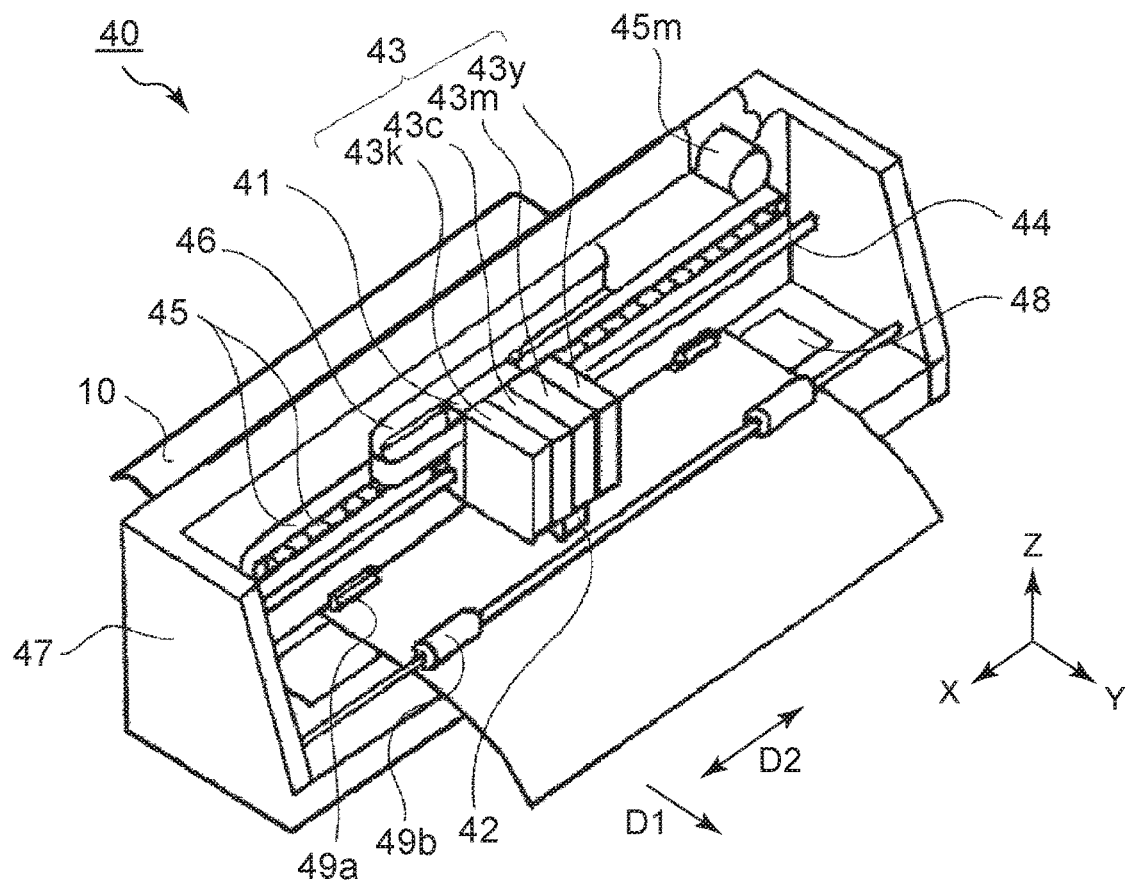
FIG. 14 is a perspective view illustrating one example of a configuration of a print device according to the embodiment 1.

One example of a detailed configuration of the print device 40 is illustrated in FIG. 14. As illustrated in FIG. 14, the print device 40 includes a carriage 41 which is reciprocally movable in a main scanning direction D2 (the X direction) which is orthogonal to a sub scanning direction D1 (the Y direction) which is a direction that the thermally expandable sheet 10 is conveyed.

A print head 42 which executes the printing and an ink cartridge 43 (43$k$, 43$c$, 43$m$, 43$y$) which contains the ink are attached to the carriage 41. Color inks of black K, cyan C, magenta M and yellow Y are contained in the ink cartridges 43k, 43c, 43m and 43y respectively. The ink of each color is ejected through a corresponding nozzle in the print head 42.

The carriage 41 is slidably supported on a guide rail 44 and is nipped and held to a drive belt 45. The drive belt 45 is driven by rotation of a motor 45m and thereby the carriage 41 moves in the main scanning direction D2 together with the print head 42 and the ink cartridge 43.

A platen 48 is installed on a lower part of a frame 47 at a position where the platen 48 faces the print head 42. The platen 48 extends in the main scanning direction D2 and configures part of a conveyance path of the thermally expandable sheet 10. A paper feed roller pair 49a (a lower roller is not illustrated) and a paper discharge roller pair 49b (a lower roller is not illustrated) are installed on the conveyance path of the thermally expandable sheet 10. The paper feed roller pair 49a and the paper discharge roller pair 49b convey the thermally expandable sheet 10 which is supported by the platen 48 in the sub scanning direction D1.

Although none of them is illustrated, the print device 40 includes a control unit such as a CPU and so forth and a storage unit such as a ROM, a RAM, a nonvolatile memory and so forth. In the control unit, the CPU executes a control program which is stored in the ROM while using the RAM as a work memory and thereby controls an operation of the print device 40. In addition, the print device 40 is connected with the simulation device 30 via a flexible communication cable 46. The print device 40 acquires the print data from the simulation device 30 via the flexible communication cable 46 on the basis of control from the control unit. Then, the print device 40 executes the printing on the thermally expandable sheet 10 in accordance with the acquired print data.

Specifically describing, the print device 40 controls the paper feed roller pair 49a and the paper discharge roller pair 49b and makes the paper feed roller pair 49a and the paper discharge roller pair 49b convey the thermally expandable sheet 10. In addition, the print device 40 moves the carriage 41 by rotating the motor 45m and makes the carriage 41 convey the print head 42 to an appropriate position in the main scanning direction D2. Then, the print device 40 makes the print head 42 inject the ink toward the thermally expandable sheet 10 which is conveyed. Thereby, the print device 40 prints a color image on the surface of the thermally expandable sheet 10 with the ink of one color in the color inks which include the color inks cyan C, magenta M, yellow Y and black K.

<Expansion Device 50>

The expansion device 50 is an expansion unit which makes the thermally expandable sheet 10 generate heat and expand by irradiating the thermally expandable sheet 10 on which the conversion layer 14 is formed by the printing by the print device 40 with the electromagnetic waves. The expansion device 50 may be also called a heating device, an irradiation device and so forth.

Figure 15:
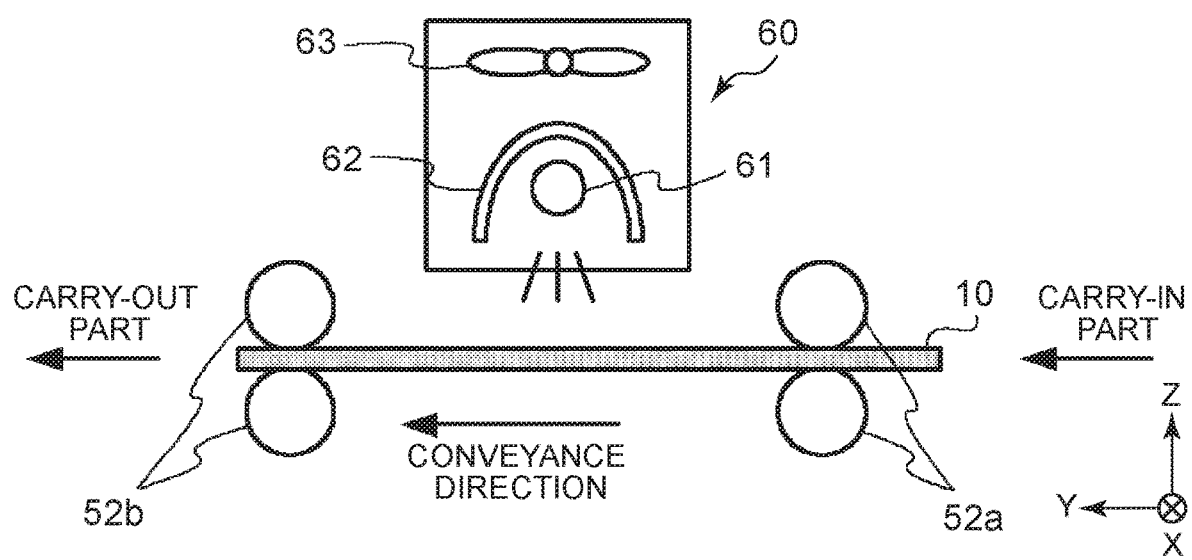
FIG. 15 is a diagram schematically illustrating one example of an internal configuration of an expansion device according to the embodiment 1.

One example of an internal configuration of the expansion device 50 is illustrated in FIG. 15. As illustrated in FIG. 15, the expansion device 50 includes conveyor roller pairs 52a and 52b which convey the thermally expandable sheet 10 and an irradiation unit 60 which irradiates the thermally expandable sheet 10 with the electromagnetic waves.

The conveyer roller pairs 52a and 52b convey the thermally expandable sheet 10 which is carried in through a carry-in part along a conveyance guide (illustration is omitted). The conveyer roller pair 52a is installed on the side which is closer to the carry-in part than to the irradiation unit 60 and conveys the thermally expandable sheet 10 which is carried in through the carry-in part to the position where the thermally expandable sheet 10 is irradiated with the electromagnetic waves by the irradiation unit 60. The conveyer roller pair 52b is installed on the side which is closer to a carry-out part than to the irradiation unit 60 and conveys the thermally expandable sheet 10 which is irradiated with the electromagnetic waves by the irradiation unit 60 to the carry-out part.

Each of the conveyer roller pairs 52a and 52b includes one pair of rollers and nips and holds the thermally expandable sheet 10 by the one pair of rollers. The one pair of rollers is connected with a conveyance motor (illustration is omitted) and rotates by using driving force which is generated with rotation of the conveyance motor as a power source. The conveyance motor is, for example, a stepping motor which operates in synchronization with pulse power. Owing to the configuration like this, the conveyer roller pairs 52a and 52b convey the thermally expandable sheet 10 while turning the front-side face or the back-side face of the thermally expandable sheet 10 to the irradiation unit 60.

The irradiation unit 60 is a mechanism which irradiates the thermally expandable sheet 10 with the electromagnetic waves and irradiates the thermally expandable sheet 10 which is conveyed by the conveyer roller pairs 52a and 52b with the electromagnetic waves. As illustrated in FIG. 15, the irradiation unit 60 includes a lamp heater 61, a reflective plate 62 and a cooling fan 63.

The lamp heater 61 is, for example, a halogen lamp and irradiates the thermally expandable sheet 10 with the electromagnetic waves in a near-infrared region (750 to 1400 nm in wavelength), a visible light region (380 to 750 nm in wavelength) or a mid-infrared region (1,400 to 4,000 nm in wavelength).

The reflective plate 62 is an irradiated element which receives the electromagnetic waves which are emitted from the irradiation unit 60 and reflects the electromagnetic waves which are emitted from the lamp heater 61 toward the thermally expandable sheet 10. The reflective plate 62 is installed so as to cover over the lamp heater 61 and reflects the electromagnetic waves which are emitted upward from the lamp heater 61 downward. The reflective plate 62 makes it possible to efficiently irradiate the thermally expandable sheet 10 with the electromagnetic waves which are emitted from the lamp heater 61.

The cooling fan 63 is installed above the reflective plate 62. The cooling fan 63 sucks air from the outside of the expansion device 50 and sends the air to the reflective plate 62. Thereby, the cooling fan 63 cools the reflective plate 62 which is heated by turning on the lamp heater 61.

Although none of them is illustrated, the expansion device 50 includes a control unit such as a CPU and so forth and a storage unit such as a ROM, a RAM, a nonvolatile memory and so forth. In the control unit, the CPU executes a control program which is stored in the ROM while using the RAM as a work memory and thereby controls an operation of the expansion device 50. In addition, the expansion device 50 is connected with the simulation device 30 via an appropriate communication cable (illustration is omitted) and operates on the basis of control from the simulation device 30.

The user inserts the thermally expandable sheet 10 the front-side face or the back-side face of which the conversion layer 14 is formed by the print device 40 into the carry-in part with the face on which the conversion layer 14 is formed turning toward the irradiation unit 60 side. The expansion device 50 conveys the thermally expandable sheet 10 which is carried in through the carry-in part by driving the conveyer roller pairs 52a and 52b and emits the electromagnetic waves from the irradiation unit 60 thereby to irradiate the thermally expandable sheet 10 which is being conveyed with the electromagnetic waves. In a case where the thermally expandable sheet 10 is irradiated with the electromagnetic waves, the part of the thermally expandable sheet 10 on which the conversion layer 14 is formed generates heat because an electromagnetic wave-heat conversion material which is contained in the conversion layer 14 converts the electromagnetic waves into heat. In a case where the thermal expansion agent which is contained in the thermal conversion layer 12 is heated to a temperature at which expansion is started, the thermally expandable sheet 10 begins to expand. The thermally expandable sheet 10 which expands in this way is carried out to the outside through the carry-out part of the expansion device 50.

<Processing Flow of Shaping System 1>

A flow of processing which is executed by the shaping system 1 which is configured as described above will be described. Firstly, the flow of processing which is executed by the simulation device 30 will be described with reference to a flowchart which is illustrated in FIG. 16.

Figure 16:
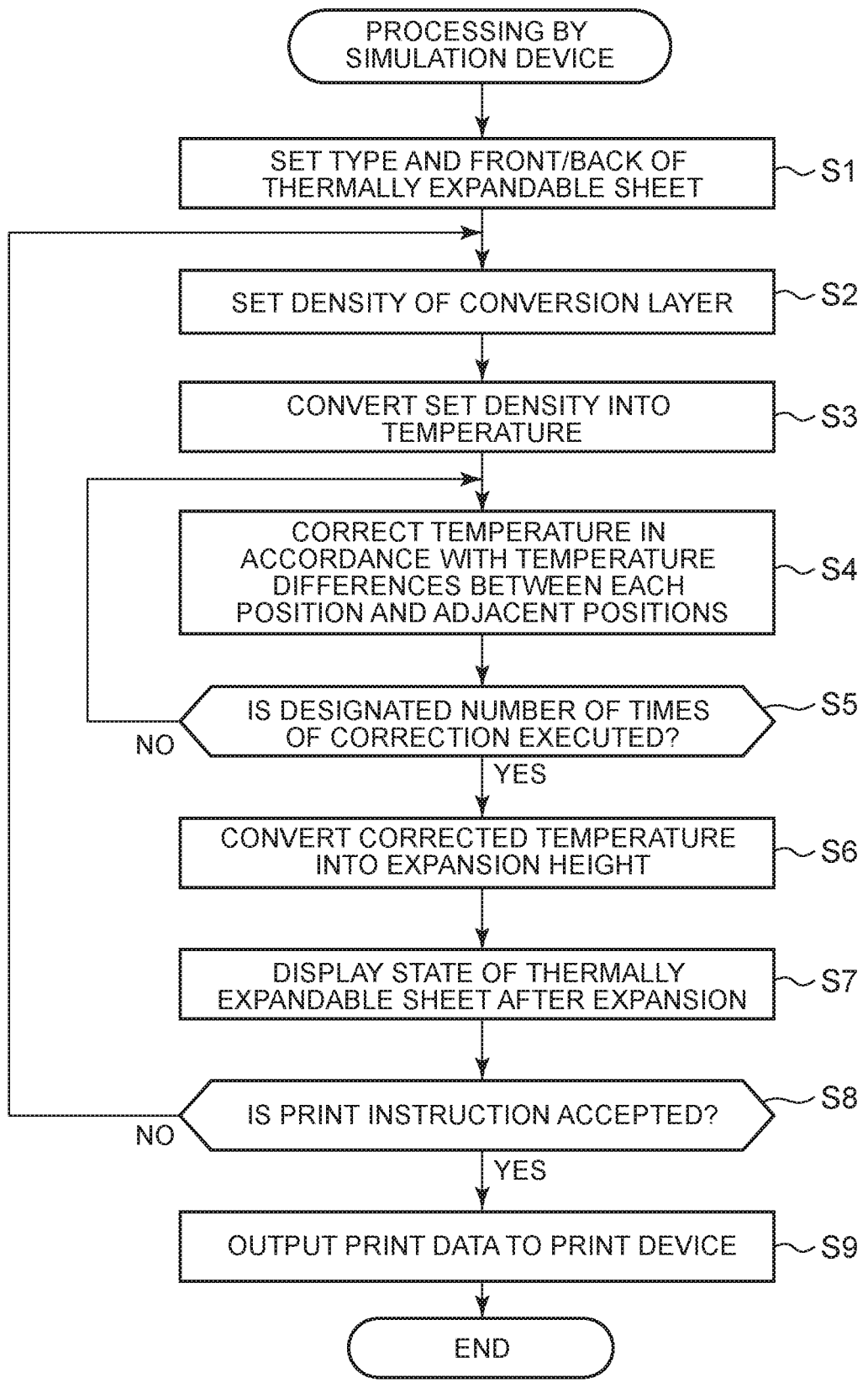
FIG. 16 is a flowchart illustrating one example of a flow of processing which is executed by the simulation device according to the embodiment 1.

In the processing which is illustrated in FIG. 16, the control unit 31 of the simulation device 30 sets the type and the front/back (the front-side face/the back-side face) of the thermally expandable sheet 10 (step S1). Specifically describing, the control unit 31 sets the type (which is determined depending on differences in size, thickness, layer configuration and so forth) of the thermally expandable sheet 10 which is to be used for forming the shaped object and in accordance with the input which is accepted from the user via the input acceptance unit 33. In addition, the control unit 31 sets whether only the front-foaming is to be executed, whether only the back-foaming is to be executed or whether both the front-foaming and the back-foaming are to be executed also in accordance with the input which is accepted from the user.

The control unit 31 sets the type and the front/back of the thermally expandable sheet 10 and then sets the density of the conversion layer 14 to be formed on the thermally expandable sheet 10 in accordance with the input which is accepted from the user via the input acceptance unit 33 (step S2). Specifically describing, the control unit 31 sets the expansion region 20 in which the conversion layer 14 is to be formed and the non-expansion region 21 in which the conversion layer 14 is not to be formed, for example, as illustrated in FIG. 6. Then, the control unit 31 sets a higher density to a part which is to be expanded more largely in the expansion region 20.

The control unit 31 sets the density of the conversion layer 14 and then converts the set density into a corresponding temperature (step S3). Specifically describing, the control unit 31 derives the temperature of the conversion layer 14 which is obtained in a case where the conversion layer 14 which is set to the above-described density is irradiated with the electromagnetic waves from the density of the conversion layer 14 which is set at each position on the thermally expandable sheet 10 with reference to the density-temperature conversion table 321 which is stored in the storage unit 32.

The control unit 31 converts the density into the temperature and then corrects the temperature at each position on the thermally expandable sheet 10 in accordance with the temperature difference between each position and each of the adjacent positions (step S4). Specifically describing, the control unit 31 calculates the accumulated value ΔT of the temperature differences between each position and the eight positions which are adjacent to each position in the transverse direction (the X direction), the longitudinal direction (the Y direction) and the diagonal directions in regard to each of the plurality of positions (1, 1) to (I, J) on the thermally expandable sheet 10. Then, the control unit 31 divides the calculated accumulated value ΔT by the thermal conduction coefficient k which is defined in accordance with the type and the front/back of the thermally expandable sheet 10 which are set in step S1 and corrects the temperature at each position on the thermally expandable sheet 10 which is obtained in step S3 by using a value which is obtained by division as a corrected value.

The control unit 31 corrects the temperature in this way and then decides whether the designated number of times of correction is executed (step S5). In a case where the designated number of times of correction is not executed (step S5: NO), the control unit 31 returns the process to step S4. Then, the control unit 31 corrects the temperature at each position on the thermally expandable sheet 10 which is already corrected on the basis of the temperature differences between each position and the adjacent positions further on the basis of the temperature differences between each position and the adjacent positions. The control unit 31 repeats execution of the correction process in step S4 until the designated number of times of correction is executed in this way. Thereby, the control unit 31 simulates the state where the heat which is generated in the conversion layer 14 gradually diffuses in the thermally expandable sheet 10.

Finally, the control unit 31 executes the designated number of times of the correction (step S5: YES) and then terminates execution of the temperature correction process. Then, the control unit 31 converts the corrected temperature into the corresponding expansion height (step S6). Specifically describing, the control unit 31 derives, from the temperature which is obtained at each position on the thermally expandable sheet 10, the expansion height at each position on the thermally expandable sheet 10 which is obtained in a case where the thermally expandable sheet 10 is heated at the temperature which is obtained at each position with reference to the temperature-height conversion table 322 which is stored in the storage unit 32.

The control unit 31 converts the corrected temperature into the expansion height and then displays a state of the thermally expandable sheet 10 which is obtained after expansion (step S7). Specifically, as illustrated in FIG. 13, the control unit 31 generates the image which expresses the state where the thermally expandable sheet 10 expands up to the expansion height which is obtained in step S6 in the simulative manner and displays the image on the display unit 34.

The control unit 31 displays the state of the thermally expandable sheet 10 which is obtained after expansion and then decides whether a print instruction is accepted from the user (step S8). In a case where the user decides that it is possible to obtain the desirable shaped object as a result of confirmation of the preview display, the user inputs the print instruction so as to form the conversion layer 14 on the thermally expandable sheet 10 on the basis of the current setting.

In a case where the print instruction is not accepted (step S8: NO), the control unit 31 returns the process to step S2. In this case, the user resets the density of the conversion layer 14 which is to be formed at each position on the thermally expandable sheet 10. Then, the control unit 31 executes processes in step S3 to step S7 on the density which is obtained after resetting. That is, the control unit 31 derives the corresponding temperature from the density which is obtained after resetting, corrects the derived temperature on the basis of the surrounding temperatures, derives the corresponding expansion height from the corrected temperature and displays a preview of an obtained result. The user is able to repetitively adjust the density of the conversion layer 14 which is to be formed at each position on the thermally expandable sheet 10 until deciding that the desirable modeled object is obtained while seeing a preview screen in this way.

On the other hand, the control unit 31 accepts the print instruction (step S8: YES), and then communicates with the print device 40 via the communication unit 36 and outputs the print data on the conversion layer 14 to the print device 40 (step S9). Thereby, the control unit 31 makes the print device 40 form the conversion layer 14 of the density which is set in step S2 on the thermally expandable sheet 10. From the above, execution of the processing by the simulation device 30 which is illustrated in FIG. 16 is terminated.

Incidentally, in a case where the conversion layers 14 are to be formed on both the front-side face and the back-side face of the thermally expandable sheet 10, the processes in step S1 to step S9 which are illustrated in FIG. 16 are executed for both the front-side face and the back-side face.

Figure 17:
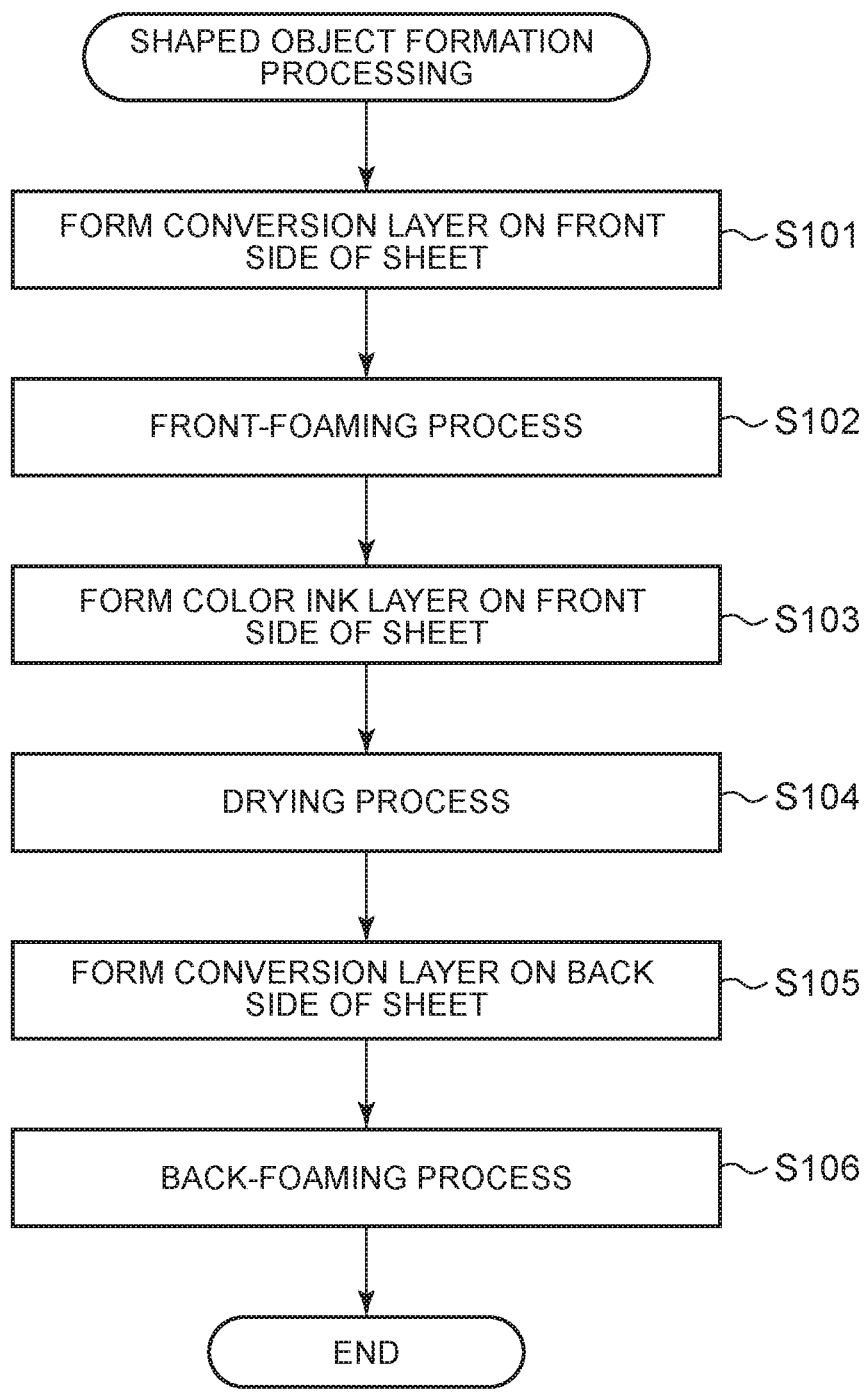
FIG. 17 is a flowchart illustrating one example of a flow of a shaped object formation processing which is executed by a shaping system according to the embodiment 1.

Secondly, a flow of shaped object formation processing to be executed by the print device 40 and the expansion device 50 will be described with reference to a flowchart illustrated in FIG. 17 and sectional diagrams of the thermally expandable sheet 10 which are illustrated in FIG. 18A to FIG. 18E.

Figure 18A:
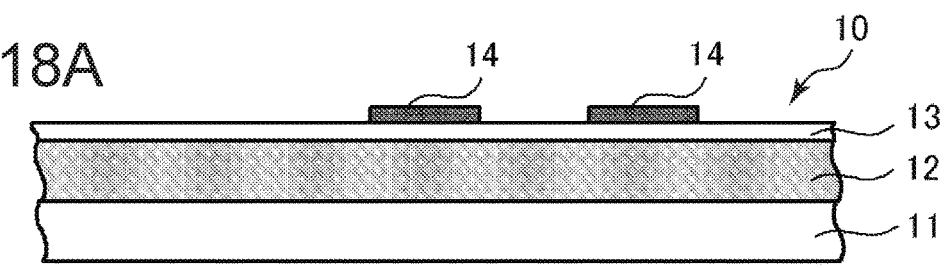
FIG. 18A to FIG. 18E are diagrams illustrating one example of a state where each shaped object is gradually formed on the thermally expandable sheet in the embodiment 1.

Firstly, the user prepares the thermally expandable sheet 10 which is in a state before the shaped object is formed and designates color image data, front-foaming data and back-foaming data via the input acceptance unit 33. Then, the user inserts the thermally expandable sheet 10 into the print device with the front-side face of the thermally expandable sheet 10 turning upward. The print device 40 forms the conversion layer 14 on the front-side face of the inserted thermally expandable sheet 10 (step S101). Specifically, the print device 40 ejects the black ink which contains carbon black onto the front-side face of the thermally expandable sheet 10 in accordance with the designated front foaming data. As a result, the conversion layers 14 are formed on the ink receiving layer 13 as illustrated in FIG. 18A.

Figure 18B:
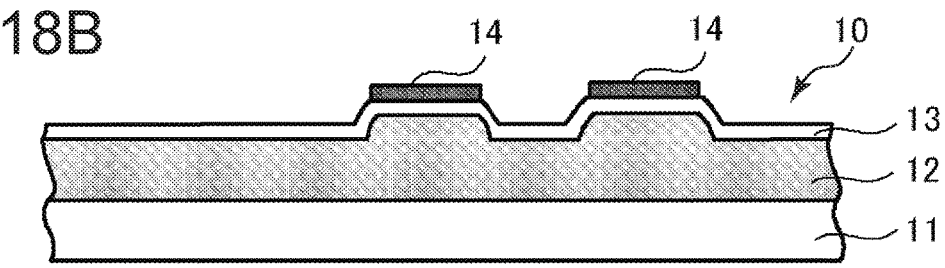

Secondly, the user inserts the thermally expandable sheet 10 on the front-side face of which the conversion layers 14 are formed with the front-side face of the thermally expandable sheet 10 turning upward. The expansion device 50 executes a front foaming process on the inserted thermally expandable sheet 10 (step S102). Specifically, the expansion device 50 irradiates the front-side face of the thermally expandable sheet 10 with the electromagnetic waves by using the irradiation unit 60. The conversion layers 14 which are formed on the front-side face of the thermally expandable sheet 10 generate heat by absorbing the electromagnetic waves with which the front-side face is irradiated. As a result, on the thermally expandable sheet 10, regions that the conversion layers 14 are formed expand and swell as illustrated in FIG. 18B.

Figure 18C:
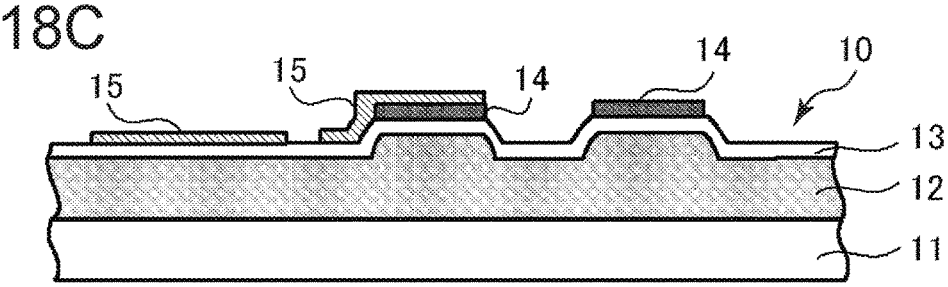

Thirdly, the user inserts the thermally expandable sheet 10 that the parts of the thermal expansion layer 12 expand into the print device 40 with the front-side face of the thermally expandable sheet 10 turning upward. The print device 40 forms color ink layers 15 on the front-side face of the inserted thermally expandable sheet 10 (step S103). Specifically, the print device 40 ejects the respective inks of the cyan C, the magenta M and the yellow Y onto the front-side face of the thermally expandable sheet 10 in accordance with the designated color image data. As a result, the color ink layers 15 are formed on the ink receiving layer 13 as illustrated in FIG. 18C.

Fourthly, the user inserts the thermally expandable sheet 10 on which the color ink layers 15 are formed into the expansion device 50 with the back-side face of the thermally expandable sheet 10 turning upward. The expansion device 50 executes a drying process on the inserted thermally expandable sheet 10 (step S104). Specifically describing, the expansion device 50 irradiates the back-side face of the thermally expandable sheet 10 with the electromagnetic waves by using the irradiation unit 60. Thereby, the expansion device 50 volatilizes a solvent which is contained in the ink color layers 15 which are formed on the front-side face of the thermally expandable sheet 10 and dries the color ink layers 15.

Figure 18D:
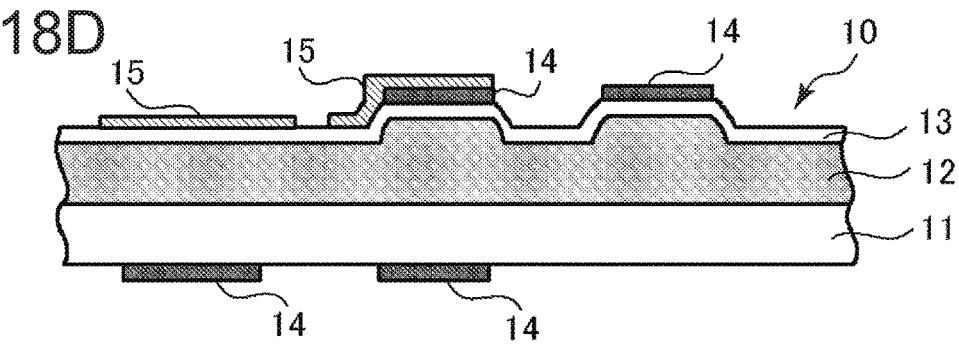

Fifthly, the user inserts the thermally expandable sheet 10 on which the color ink layers 15 are formed into the print device 40 with the back-side face of the thermally expandable sheet 10 turning upward. The print device 40 forms the conversion layers 14 on the back-side face of the inserted thermally expandable sheet 10 (step S105). Specifically, the print device 40 ejects the black ink which contains the carbon black onto the back-side face of the thermally expandable sheet 10 in accordance with the designated back foaming data. As a result, the conversion layers 14 are formed on a back-side face of the base material 11 as illustrated in FIG. 18D.

Figure 18E:
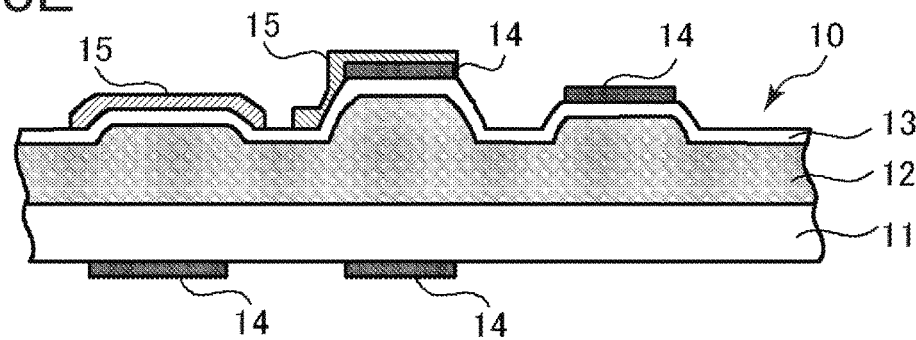

Sixthly, the user inserts the thermally expandable sheet 10 on which the conversion layers 14 are formed into the expansion device 50 with the back-side face of the thermally expandable sheet 10 turning upward. The expansion device 50 executes a back-foaming process on the inserted thermally expandable sheet 10 (step S106). Specifically, the expansion device 50 irradiates the back-side face of the thermally expandable sheet 10 with the electromagnetic waves by using the irradiation unit 60. The conversion layers 14 which are formed on the back-side face of the thermally expandable sheet 10 generate heat by absorbing the electromagnetic waves with which the back-side face of the thermally expandable sheet 10 is irradiated. As a result, on the thermally expandable sheet 10, a region where the conversion layer 14 is formed expands and swells as illustrated in FIG. 18E.

The shaped object(s) is/are formed on the surface of the thermally expandable sheet 10 in accordance with such a procedure as described above.

Incidentally, the conversion layer(s) 14 may be formed either only on the front-side face or only on the back-side face. In a case of expanding the thermal expansion layer 12 by utilizing only the front-side conversion layer 14, the processes in step S101 to step S104 are executed in the above-described processes. On the other hand, in a case of expanding the thermal expansion layer 12 by utilizing only the back-side conversion layer 14, the processes in step S103 to step S106 are executed in the above-described processes. In addition, the back-side foaming process in step S105 and step S106 may be executed before execution of the front-foaming process in step S101 and step S102. A process for forming the color ink layers 15 in step S103 and a process for drying the color ink layers 15 in step S104 may be executed before execution of the front-foaming process in step S101 and step S102. Otherwise, the front-foaming process in step S102 may be executed after execution of the process for forming the front-side conversion layers 14 in step S101 and the process for forming the color ink layers 15 in step S103. The processes may be executed by changing the order of step S101 to step S106 in a variety of ways in this way.

As described above, the simulation device 30 according to the embodiment 1 corrects the temperature of the conversion layer 14 which is obtained in a case where the conversion layer 14 having the density which is set is irradiated with the electromagnetic waves on the basis of the surrounding temperatures on the thermally expandable sheet 10 and derives the expansion height of the thermally expandable sheet 10 which is obtained in a case where the thermally expandable sheet 10 is heated at the corrected temperature. On that occasion, the simulation device 30 executes a simulation relating to heat conduction in the thermally expandable sheet 10 on the basis of the conditions which are defined in accordance with the type of the thermally expandable sheet 10 and corrects the temperature on the basis of a result of execution of the simulation. In other words, the simulation device 30 corrects the temperature by taking that the way of heat conduction which occurs in the thermally expandable sheet 10 differs depending on the thermally expandable sheet 10 which is used into consideration and derives the expansion height on the basis of the corrected temperature. Thereby, it becomes possible to accurately estimate the expansion height of the thermally expandable sheet 10 even when the type of the thermally expandable sheet 10 used changes in a variety of ways.

Embodiment 2

Next, the embodiment 2 of the present invention will be described.

Figure 19:
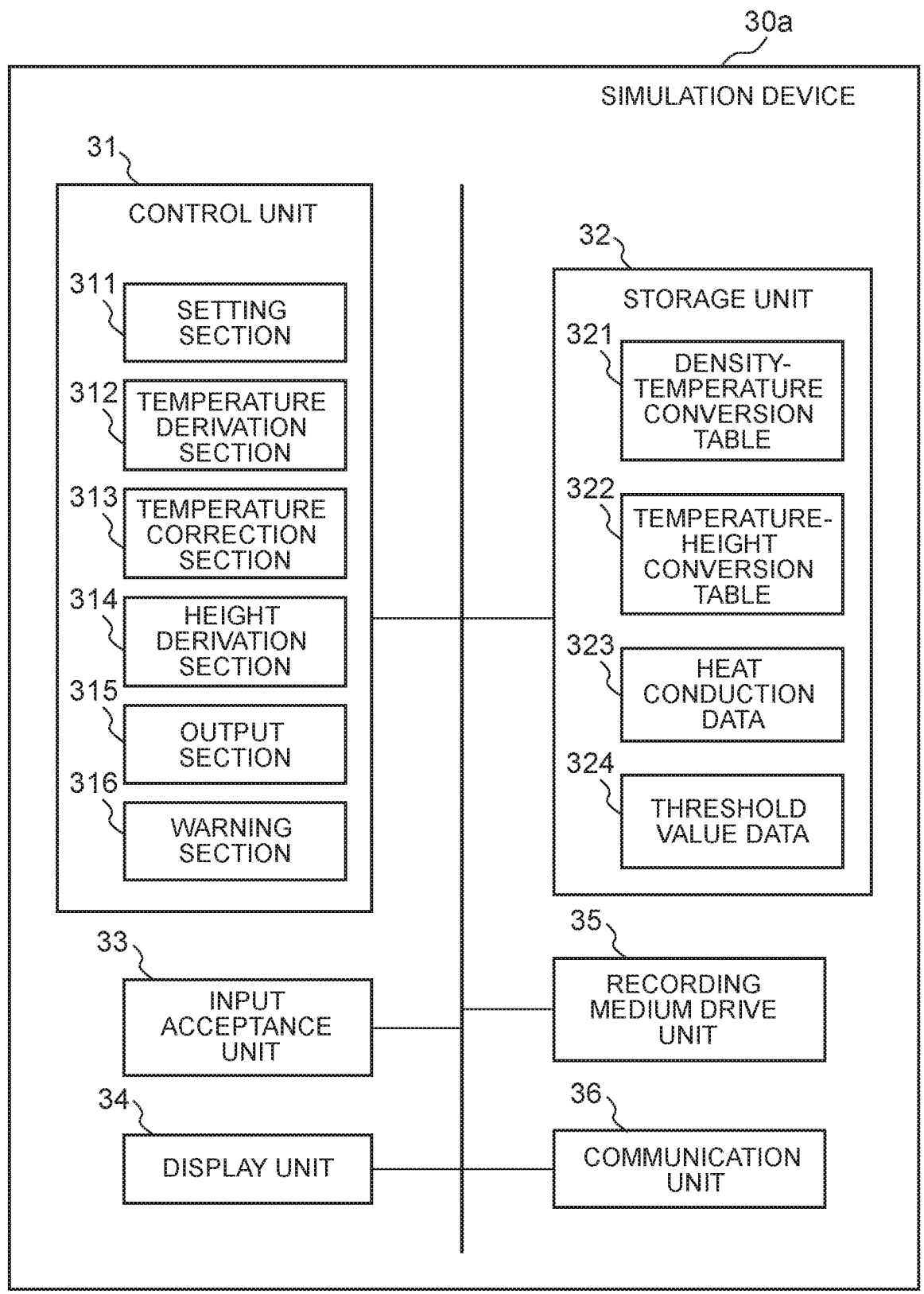
FIG. 19 is a block diagram illustrating one example of a configuration of a simulation device according to an embodiment 2 of the present invention.

One example of a configuration of a simulation device 30a according to the embodiment 2 is illustrated in FIG. 19. As illustrated in FIG. 19, the simulation device 30a according to the embodiment 2 includes the control unit 31, the storage unit 32, the input acceptance unit 33, the display unit 34, the recording medium drive unit 35 and the communication unit 36. The control unit 31 functionally includes the setting section 311, the temperature derivation section 312, the temperature correction section 313, the height derivation section 314, the output section 315 and a warning section 316. In the above-described sections, the functions of the sections other than the warning section 316 are the same as the functions of the sections in the embodiment 1 and therefore description thereof is omitted. In addition, the storage unit 32 stores therein the density-temperature conversion table 321, the temperature-height conversion table 322, the heat conduction data 323 and threshold value data 324. In the above-described tables and data, the data and the tables other than the threshold data 324 are the same as the data and the tables in the embodiment 1 and therefore description thereof is omitted.

The warning section 316 issues a warning in a case where the expansion height which is derived by the height derivation section 314 is higher than a predetermined threshold value. The predetermined threshold value is an upper limit value of the expansion height which is defined in advance such that the thermally expandable sheet 10 would not excessively expand. In a case where the expansion height becomes too high, there is a fear that the expansion device 50 would not able to appropriately process the thermally expandable sheet 10 because of contact between the surface of the thermally expandable sheet 10 and the irradiation unit 60, the impossibility of nipping and holding of the thermally expandable sheet 10 by the conveyer roller pairs 52a and 52b and so forth. Accordingly, in a case where the expansion height which is derived by the height derivation section 314 exceeds the predetermined threshold value, the warning section 316 issues a warning for encouraging the user to set again the density of the conversion layer 14.

In particular, as described above, since the heat which is generated in the conversion layer 14 escapes to the surroundings, when the thermally expandable sheet 10 is actually expanded in accordance with the density of the conversion layer 14 that the user sets, there are cases where it is impossible to obtain the expansion height that the user assumes. For example, in a case where a thin line-shaped expansion region 20a which is illustrated in FIG. 20 is to be expanded, heat in the expansion region 20a escapes to the surroundings with ease. For example, in a case where the temperature at which the expansion height reaches 1 mm is 160° C. in the corresponding relation between each temperature and each expansion height which is illustrated in FIG. 12, even when the expansion region 20a is heated at 160° C., the heat escapes to the surroundings and therefore the expansion height which reaches 1 mm is not obtained. That is, in order to expand the thermally expandable sheet 10 to the height of 1 mm, it is necessary to heat the expansion region 20a at a temperature (for example, 190° C.) which exceeds 160° C. Then, it is also necessary to set the density of the conversion layer 14 high accordingly.

On the other hand, in a case where an expansion region 20b which is illustrated in FIG. 20 and is relatively wide in area is to be expanded, since also the surroundings are heated, heat of a central part of the expansion region 20b is difficult to escape. Accordingly, in a case where the conversion layer 14 which is the same as other parts in density is formed, the central part of the expansion region 20b has a tendency to expand higher. As a result, there are cases where the expansion height becomes too high unexpectedly.

Since a relation between the density and the actual expansion height of the conversion layer 14 changes depending on the size and the shape of the expansion region 20, it is difficult to accurately adjust the expansion height. Therefore, there are also cases where the expansion height becomes too high unexpectedly up to such an extent that it becomes impossible to appropriately process the thermally expandable sheet 10 for the expansion device 50. Accordingly, in a case where the expansion height which is derived by the height derivation section 314 by taking heat conduction to the surroundings into consideration exceeds the predetermined threshold value, the warning section 316 issues the warning to the user.

The predetermined threshold value is defined in advance in the threshold data 324 which is stored in the storage unit 32. One example of the threshold value data 324 is illustrated in FIG. 21. As illustrated in FIG. 21, in the threshold value data 324, three threshold values TH1 to TH3 are defined for every type of the thermally expandable sheet 10 as the predetermined threshold values.

The first threshold value TH1 is a threshold value which is used in a case where the conversion layer 14 is formed on the front-side face of the thermally expandable sheet 10. In the case where the conversion layer 14 is formed on the front-side face of the thermally expandable sheet 10, the warning section 316 decides whether the expansion height which is derived by the height derivation section 314 is higher than the first threshold value TH1. Describing in more detail, the warning section 316 decides whether the expansion height at any of the plurality of positions (1, 1) to (I, J) on the thermally expandable sheet 10 is higher than the first threshold value TH1. As a result of decision, in a case where the expansion height at any position is higher than the first threshold value TH1, the warning section 316 decides that there is the possibility that appropriate processing of the thermally expandable sheet 10 would become impossible in the front-foaming process by the expansion device 50 and issues the warning.

One example of the warning which is issued from the waning section 316 is illustrated in FIG. 22. For example, as illustrated in FIG. 22, the warning section 316 displays such a waning message that "The expansion height exceeds the upper limit value. Please set again the density of the conversion layer" on the display unit 34. The user becomes able to grasp with ease that setting of the density of the conversion layer 14 is not appropriate and it is necessary to set the density again by seeing the warning message like this.

The second threshold value TH2 is a threshold value which is used in a case where the conversion layer 14 is formed on the back-side face of the thermally expandable sheet 10 and is set to a value which is different from the value of the first threshold value TH1. In the case where the conversion layer 14 is formed on the back-side face of the thermally expandable sheet 10, the warning section 316 decides whether the expansion height which is derived by the height derivation section 314 is higher than the second threshold value TH2. Describing in more detail, the warning section 316 decides whether the expansion height at any of the plurality of positions (1, 1) to (I, J) on the thermally expandable sheet 10 is higher than the second threshold value TH2. As a result of decision, in a case where the expansion height at any position is higher than the second threshold value TH2, the warning section 316 issues the warning which is the same as the warning which is illustrated in FIG. 22.

The third threshold value TH3 is a threshold value which is used in a case where the conversion layers 14 are formed on both the front-side face and the back-side face of the thermally expandable sheet 10. In the case where the conversion layers 14 are formed on both the front-side face and the back-side face of the thermally expandable sheet 10, the warning section 316 decides whether the sum of the expansion height which is obtained in the case where the conversion layer 14 is formed on the front-side face of the thermally expandable sheet 10 and the expansion height which is obtained in the case where the conversion layer 14 is formed on the back-side face of the thermally expandable sheet 10 is higher than the third threshold value TH3.

Describing in more detail, the warning section 316 calculates the sum of the expansion heights which are obtained in the case where the conversion layers 14 are formed on both the front-side face and the back-side face of the thermally expandable sheet 10 in regard to each of the plurality of positions (1, 1) to (I, J) on the thermally expandable sheet 10. Then, the warning section 316 decides whether the sum of the expansion heights at any of the plurality of positions (1, 1) to (I, J) on the thermally expandable sheet 10 is higher than the third threshold value TH3. As a result of decision, in a case where the sum of the expansion heights at any position is higher than the third threshold value TH3, the warning section 316 issues the warning which is the same as the warning which is illustrated in FIG. 22.

Figure 23:
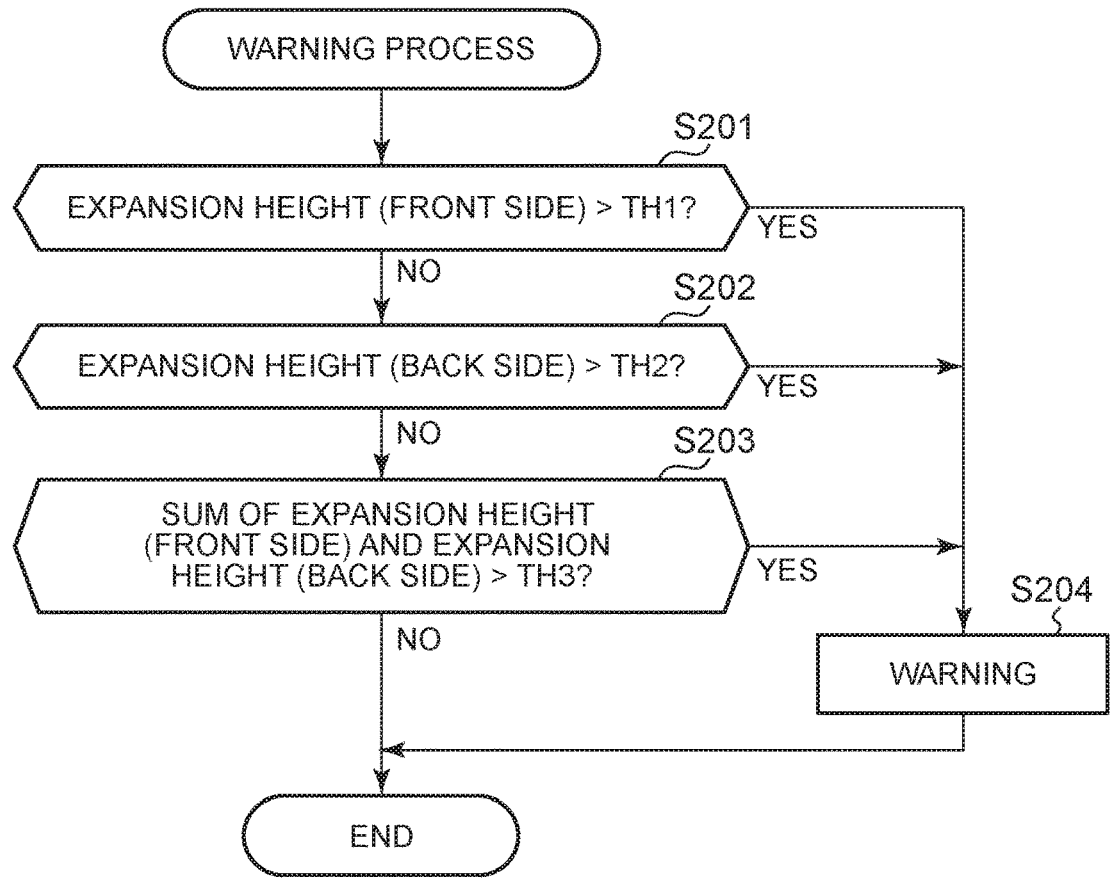
FIG. 23 is a flowchart illustrating one example of a flow of a warning process which is executed by the simulation device according to the embodiment 2.

One example of a flow of a warning process which is executed by the warning section 316 in the case where the conversion layers 14 are formed on both the front-side face and the back-side face of the thermally expandable sheet 10 is illustrated in FIG. 23. The waning process which is illustrated in FIG. 23 is executed between the expansion height deriving process (step S6) and the preview displaying process (step S7) in the processing by the simulation device 30 which is illustrated in FIG. 16.

When starting the warning process which is illustrated in FIG. 23, firstly, the warning section 316 decides whether the expansion height which is derived in step S6 in FIG. 16 is higher than the first threshold value TH1 in the case where the conversion layer 14 is formed on the front-side face of the thermally expandable sheet 10 (step S201). In a case where the expansion height which is obtained in the case where the conversion layer 14 is formed on the front-side face is lower than the first threshold value TH1 (step S201: NO), secondly, the warning section 316 decides whether the expansion height which is derived in step S6 in FIG. 16 is higher than the second threshold value TH2 in the case where the conversion layer 14 is formed on the back-side face of the thermally expandable sheet 10 (step S202). In the case where the expansion height which is obtained in the case where the conversion layer 14 is formed on the back-side face of the thermally expandable sheet 10 is lower than the second threshold value TH2 (step S202: NO), thirdly, the warning section 316 decides whether the sum of the expansion height which is obtained in the case where the conversion layer 14 is formed on the front-side face and the expansion height which is obtained in the case where the conversion layer 14 is formed on the back-side face is higher than the third threshold value TH3 (step S203). In a case where the sum of the expansion heights is lower than the third threshold value TH3 (step S203: NO), the warning section 316 terminates execution of the warning process which is illustrated in FIG. 23 without issuing any warning.

On the other hand, as a result of decisions in step S201 to step S203, in a case where the expansion height which is obtained in the case where the conversion layer 14 is formed on the front-side face of the thermally expandable sheet 10 is higher than the first threshold value TH1 (step S201: YES), in a case where the expansion height which is obtained in the case where the conversion layer 14 is formed on the back-side face of the thermally expandable sheet 10 is higher than the second threshold value TH2 (step S202: YES) or in a case where the sum of the expansion heights is higher than the third threshold value TH1 (step S203: YES), the warning section 316 issues the warning as illustrated in FIG. 22 (step S204). It becomes possible to precisely issue the warning in accordance with the situation by deciding whether the expansion height exceeds the upper limit value by using the three threshold values TH1 to TH3 in this way.

Further, as illustrated in FIG. 21, in the threshold value data 324, values which are made different from one another depending on the types of the thermally expandable sheet 10 such as, for example, the sheet A, the sheet B, the sheet C and so forth. Here, the thermally expandable sheet 10 is classified into the respective types such as the sheets A, B, C and so forth depending on differences, for example, in thickness of the thermally expandable sheet 10, configuration of the layers which are included in the thermally expandable sheet 10 and so forth. In a case where the thickness and the layer configuration of the thermally expandable sheet 10 are made different, an appropriate expansion height range varies and thereby also the upper limit value of the expansion height varies accordingly. Therefore, in the threshold data 324, the three threshold values TH1, TH2 and TH3 are individually defined depending on the type of the thermally expandable sheet 10. The warning section 316 selects one threshold value to be used from the plurality of threshold values which are defined in the threshold data 324 in accordance with the type of the thermally expandable sheet 10 to be used.

As described above, the simulation device 30a according to the embodiment 2 corrects the temperature of the conversion layer 14 which is obtained in a case where the conversion layer 14 the density of which is set is irradiated with the electromagnetic waves on the basis of the surrounding temperature on the thermally expandable sheet 10 and derives the expansion height of the thermally expandable sheet 10 which is obtained in a case where the thermally expandable sheet 10 is heated at the corrected temperature. Then, in a case where the derived expansion height is higher than the predetermined threshold value, the simulation device 30a issues the warning. Thereby, even in a case where it is difficult to expand the thermally expandable sheet 10 up to an expansion height which is desirable for the user due to heat conduction which occurs in the thermally expandable sheet 10, it is possible to suppress excessive expansion of the thermally expandable sheet 10 beyond the upper limit value. As a result, it becomes possible to suppress occurrence of a situation that appropriate processing of the thermally expandable sheet 10 becomes impossible for the expansion device 50.

Incidentally, the warning section 316 may issue the warning by other methods, not limited to display of the waning message as illustrated in FIG. 22. For example, the warning section 316 may make the display unit 34 display a part which is higher than the predetermined threshold value in the expansion height which is derived by the height derivation section 314 in a display form which is different from a display form of a part which is lower than the predetermined threshold value in the expansion height which is derived by the height derivation section 314 on the thermally expandable sheet 10. "To display in the different form" means to, for example, make colors, hatchings and so forth of both the parts different from each other, to thicken a line width of a frame of the part concerned and so forth.

Figure 24:
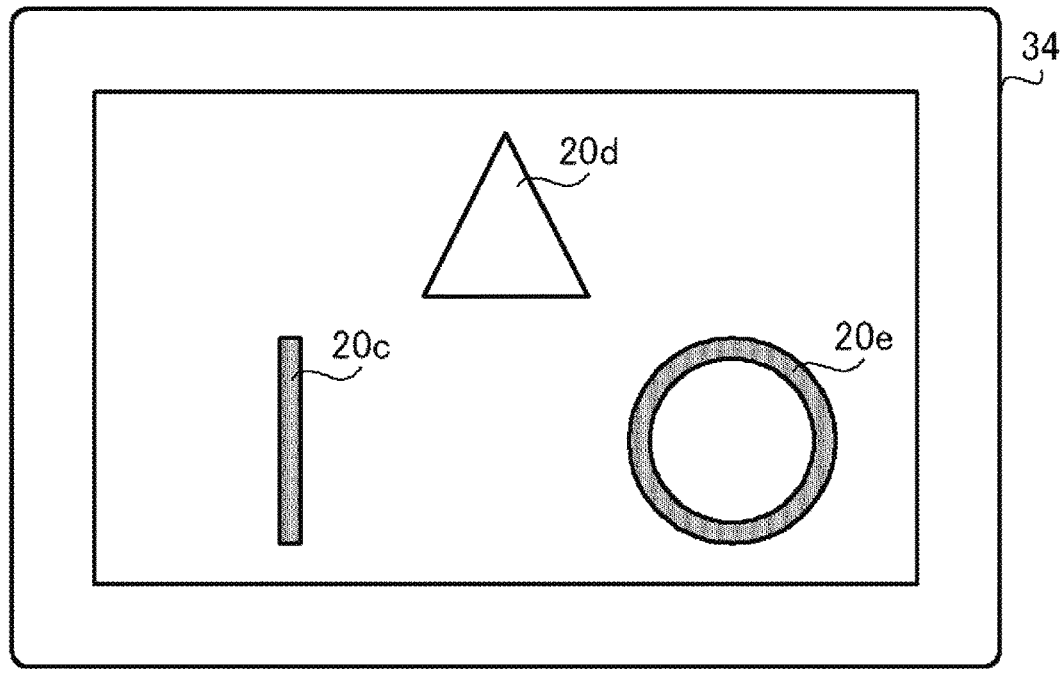
FIG. 24 is a diagram illustrating a first modified example of the warning screen which is displayed by the simulation device according to the embodiment 2.

One display example of a case where three expansion regions 20c to 20e are set on the thermally expandable sheet 10 is illustrated in FIG. 24. As illustrated in FIG. 24, for example, in a case where the expansion height of the entire line-shaped expansion region 20c and the expansion height of an outer edge of the circular expansion region 20e are higher than the predetermined threshold value, the warning section 316 makes the display unit 34 display these parts in a color which is different from a color of other parts. Thereby, the user becomes able to confirm with ease the parts which are too high in expansion height in the expansion regions 20c to 20e and to more precisely reset the density of the conversion layer 14.

In addition, in a case where the plurality of thermally expandable sheets 10 is designated as candidates for expansion, the warning section 316 may make the display unit 34 simultaneously display warnings which are respectively issued to the plurality of thermally expandable sheets 10 so as to allow sheet-by-sheet comparison. Specifically describing, as described in the embodiment 1, the conditions which are used by the temperature correction section 313 for the simulation of heat conduction are set to be different from one another depending on the type and the front/back of the thermally expandable sheet 10. Accordingly, the temperature correction section 313 corrects the temperatures which are derived by the temperature derivation section 312 on the basis of the mutually different conditions which are respectively set for the plurality of thermally expandable sheets 10. The height derivation section 314 derives the expansion height from the temperature which is corrected by the temperature correction section 313 in regard to each of the plurality of thermally expandable sheets 10. The warning section 316 makes the display unit 34 display the part that the expansion height which is derived by the height derivation section 314 is higher than the predetermined threshold value in the display form which is different from the display form of the part that the expansion height which is derived by the height derivation section 314 is lower than the predetermined threshold value on each of the plurality of thermally expandable sheets 10.

Figure 25:
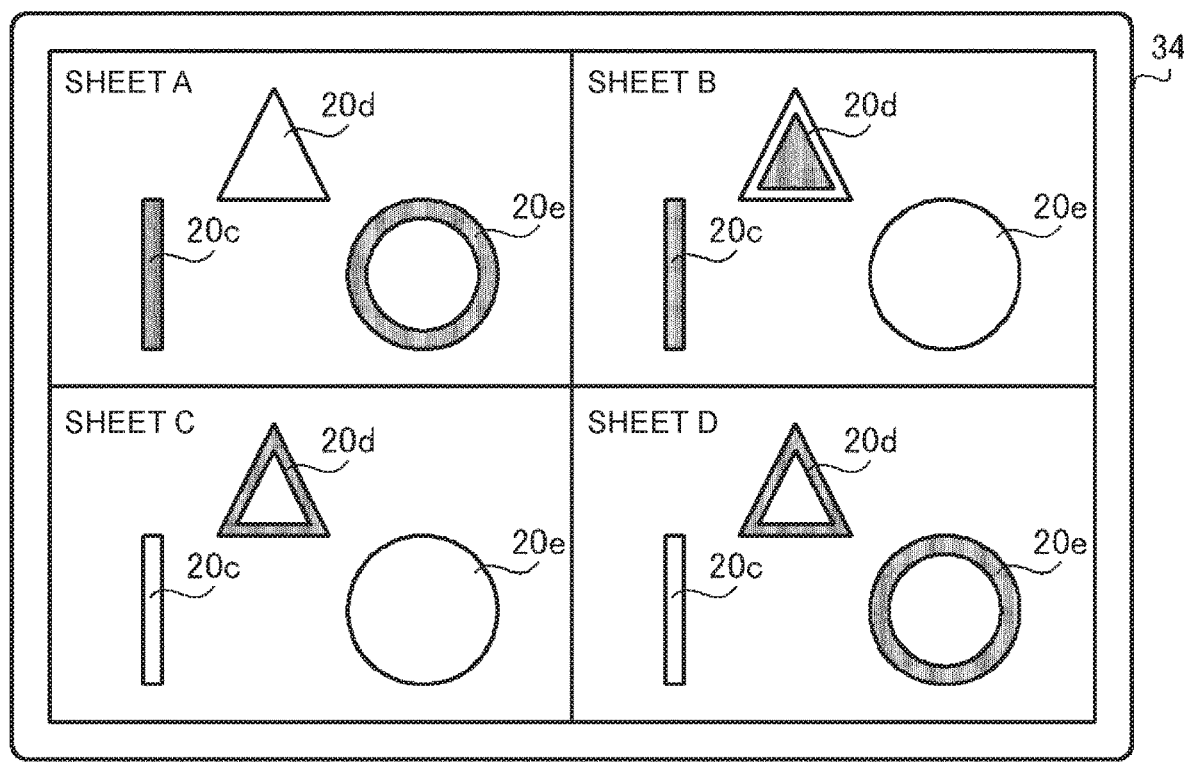
FIG. 25 is a diagram illustrating a second modified example of the warning screen which is displayed by the simulation device according to the embodiment 2.

One example that the warnings which are issued to the sheet A to the sheet D which are the different types of the four thermally expandable sheets 10 are simultaneously displayed on the display unit 34 is illustrated in FIG. 25. As illustrated in FIG. 25, the warning section 316 divides the screen of the display unit 34 into four display regions and makes the display unit 34 display images of the sheet A to the sheet D that the three expansion regions 20 to 20e are set respectively. Then, the warning section 316 makes the display unit 34 display each part which is higher than the predetermined threshold value in expansion height in each of the expansion regions 20c to 20e of each of the sheet A to the sheet D in a color which is different from the color of other parts. Since the way of heat conduction to the surroundings differs depending on a difference in type of the thermally expandable sheet 10 which is used, as illustrated in FIG. 25, the parts which exceed the predetermined threshold value in expansion height are different from one another among the sheet A to the sheet D.

Figure 26:
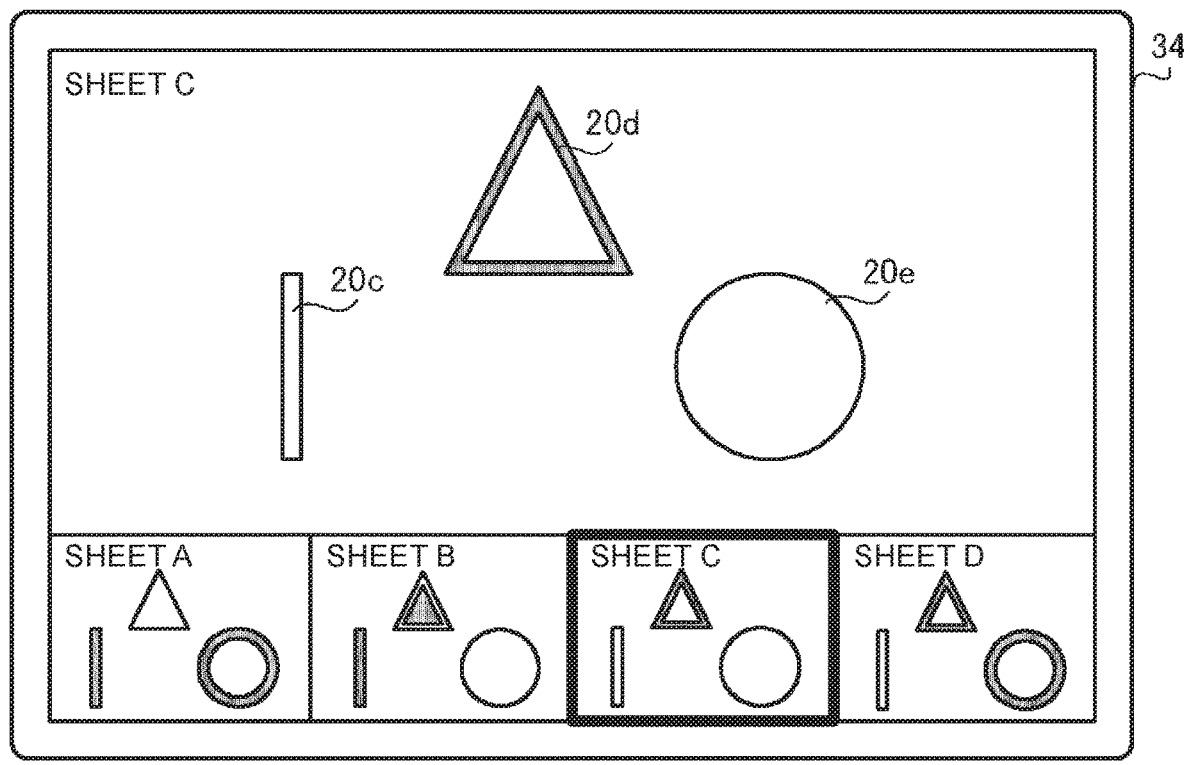
FIG. 26 is a diagram illustrating a third modified example of the warning screen which is displayed by the simulation device according to the embodiment 2.

Further, another example that the warnings which are issued to the four thermally expandable sheets 10 are simultaneously displayed on the display unit 34 is illustrated in FIG. 26. In the example in FIG. 26, the warning section 316 makes the display unit 34 display the images of the sheet A to the sheet D in a lower-side display region of the display unit 34 side by side and display the image of one sheet which is selected from the sheet A to the sheet D by the user in an enlarged state in an upper-side region of the display unit 34. FIG. 26 illustrates the example of a case where the sheet C is selected. In this case, the warning section 316 makes the display unit 34 display a part which is higher than the predetermined threshold value in expansion height in each of the expansion regions 20c to 20e in a color which is different from the color of other parts in regard to each of the sheet A to the sheet D similarly to the example in FIG. 25.

The warning section 316 makes the display unit 34 display the parts which exceed the predetermined threshold value in expansion height on the plurality of thermally expandable sheets 10 in one screen simultaneously. Thereby, in a case where the user expands the thermally expandable sheet 10 using the conversion layer 14 the density of which is set, the user becomes able to confirm which part of the thermally expandable sheet 10 extremely expands while comparing the plurality of different thermally expandable sheets 10 with one another.

Incidentally, the warning section 316 may make the display unit 34 stereoscopically display a state where the expansion regions 20c to 20e expand as illustrated in FIG. 13 and then display the part which is higher than the predetermined threshold value in expansion height in the display form which is different from the display form of other parts, not limited to planar display of the expansion regions 20c to 20e as illustrated in FIG. 24 to FIG. 26.

In addition, each of the three threshold values TH1, TH2 and TH3 which are the predetermined threshold values may be defined in accordance with a large expansion height up to which a small-sized region which is settable as the region to be expanded on the thermally expandable sheet 10 is expandable. For example, in a case where a small dotted region and a thin line-shaped region are to be expanded, the small size which is settable as the size of the region to be expanded on the thermally expandable sheet 10 has a minimum value which is settable as the size of a region such as the small dotted region, the thin line-shaped region and so forth and is defined on the basis of the accuracy of the bump which is formable on the thermally expandable sheet 10.

For example, in the expansion region 20a which is illustrated in FIG. 20, heat escapes to the surroundings with ease as described above. Therefore, even when the high-density conversion layer 14 is formed, the expansion region 20a hardly expands high. That is, a maximum expansion height up to which the expansion region 20a is expandable becomes lower than the expansion height of the expansion region 20b which is larger in size. The predetermined threshold value may be defined in accordance with the maximum expansion height up to which the minimum-sized region which is settable is expandable so as to allow appropriate expansion of even such an expandable region which is low in maximum expansion height as the above-described region. For example, in a case where the maximum expansion height up to which the minimum-sized expansion region is expandable is 1 mm, 2 mm which is two times 1 mm is defined as the threshold value.

The warning section 316 compares the threshold value which is defined in this way with the expansion height which is derived by the height derivation section 314 and issues the warning in a case where the expansion height is higher than the threshold value. It becomes possible to properly expand any expansion region of any size and shape by setting the threshold value in conformity to a lower limit of the height up to which the expansion region is expandable in this way.

Modified Example

Although the embodiments of the present invention are described above, the above-described embodiments are merely examples and the scope of application of the present invention is not limited to this. That is, the embodiments of the present invention are applicable in a variety of ways and all embodiments are included in the scope of the present invention.

For example, in the above-mentioned embodiments, the temperature correction section 313 corrects the temperature at each position on the thermally expandable sheet 10 which is derived by the temperature derivation section 312 on the basis of the temperature differences between the temperature at each position and the surrounding temperatures and the heat conduction coefficient k. However, in the present invention, the temperature correction section 313 may correct the temperature at each position on the thermally expandable sheet 10 on the basis of conditions other than the above. For example, in the above-mentioned embodiments, the temperature correction section 313 calculates the accumulated value ΔT of the temperature differences between each position and the eight adjacent positions which are adjacent to each position in the transverse direction, the longitudinal direction and the diagonal direction. However, in the present invention, the temperature correction section 313 may calculate the accumulated value ΔT of the temperature differences between each position and a smaller number or a larger number of the adjacent positions. In addition, the temperature correction section 313 may also use an index value which indicates easiness in heat conduction in the thermally expandable sheet 10, not limited to the heat conduction coefficient k which indicates difficulty in heat conduction in the thermally expandable sheet 10. As long as it is possible to estimate the temperature at each position on the thermally expandable sheet 10 on the basis of the heat conduction in the thermally expandable sheet 10, the temperature correction section 313 may correct the temperature by any technique in this way.

In addition, as the condition for the simulation, the number of times of execution of the correction process that the temperature correction section 313 corrects the temperature on the basis of the temperature differences between each position and the adjacent positions may be defined to a value which is made different depending on the type of the thermally expandable sheet 10. Specifically describing, the easiness in conduction of heat in the thermally expandable sheet 10 varies depending on the material, the thickness and so forth of each layer which is included in the thermally expandable sheet 10 which is used. Therefore, in a case where the thermally expandable sheet 10 which is used conducts heat more easily, a state where the heat is conducted to a wider range may be simulated by more increasing the number of times of execution of the correction process than in a case where the thermally expandable sheet 10 conducts heat more hardly.

Otherwise, the number of times of execution of the correction process may be defined to different values between a case where the conversion layer 14 is formed on the front-side face of the thermally expandable sheet 10 and a case where the conversion layer 14 is formed on the back-side face of the thermally expandable sheet 10. In the case where the conversion layer 14 is formed on the back-side face of the thermally expandable sheet 10, the heat spreads to the surroundings easily when the heat is conducted over the distance from the back side to the front side in comparison with the case where the conversion layer 14 is formed on the front-side face of the thermally expandable sheet 10. Accordingly, in the case where the conversion layer 14 is formed on the back-side face of the thermally expandable sheet 10, the state where the heat is conducted to the wider range may be simulated by more increasing the number of times of execution of the correction process than in the case where the conversion layer 14 is formed on the front-side face of the thermally expandable sheet 10.

In the above-mentioned embodiments, the simulation device 30 (30a) derives the expansion height of the thermally expandable sheet 10 by simulating the heat conduction in the thermally expandable sheet 10 in the case where the conversion layer 14 is formed on the thermally expandable sheet 10. However, in the present invention, the simulation device 30 (30a) may execute the same processing on a medium other than the thermally expandable sheet 10. For example, the medium may be the one that the thermal expansion layer 12 is formed by applying ink which contains the thermal expansion gent onto an object which is made of an appropriate material such as metal, plastics, a wood and so forth. The medium is not limited to have a sheet-like shape and may have a stereoscopic shape. An object to be expanded for formation of the shaped object may be any medium as long as it is the medium which has the thermal expansion layer 12 which expands with heat in this way.

In the above-mentioned embodiments, the expansion device 50 includes the conveyance mechanism which conveys the thermally expandable sheet 10 and expands the thermally expandable sheet 10 by the system of irradiating the thermally expandable sheet 10 which is conveyed with the electronic waves by the irradiation unit 60 which is fixed in position. However, in the present invention, the expansion device 50 may include a movement mechanism which moves the irradiation unit 60 along the surface of the thermally expandable sheet 10 and may expand the thermally expandable sheet 10 by a system of irradiating the thermally expandable sheet 10 which is fixed in position with the electromagnetic waves while moving the irradiation unit 60.

In the above-mentioned embodiments, the simulation device 30 (30a), the print device 40 and the expansion device 50 are devices which are configured independently of one another. However, in the present invention, in the simulation device 30 (30a), the print device 40 and the expansion device 50, at least any two may be integrated with each other. For example, the function of the simulation device 30 (30a) may be incorporated as part of the function of the expansion device 50.

In the above-mentioned embodiments, the control unit 31 of the simulation device 30 (30a) includes the CPU and functions as each of the setting section 311, the temperature derivation section 312, the temperature correction section 313, the height derivation section 314, the output section 315 and the warning section 316 by using the function of the CPU. However, in the simulation device 30 (30a) according to the present invention, the control unit 31 may include dedicated hardware such as, for example, a ASIC (Application Specific Integrated Circuit), an FPGA (Field-Programmable Gate Array), various control circuits and so forth in place of the CPU and the dedicated hardware may function as each of the setting section 311, the temperature derivation section 312, the temperature correction section 313, the height derivation section 314, the output section 315 and the warning section 316. In this case, each process may be executed by individual hardware and the respective processes may be executed altogether by single hardware. In addition, in each process, one part may be executed by the dedicated hardware and the other part may be executed by software or firmware.

Incidentally, it is obviously possible to provide the simulation devices 30 (30a) which includes a configuration for realizing the functions pertaining to the present invention in advance and it is also possible to make a computer realize the respective functions of the simulation devices 30 (30a) which is exemplified in each of the above-mentioned embodiments. That is, it is possible to apply a program which is used for realization of respective functional configurations by the simulation device 30 (30a) which is exemplified in eh of the above-mentioned embodiments in such a manner that it becomes possible for the CPU and so forth which control operations of an existing information processing device and so forth to execute the program.

Such a program application method is optional. It is possible to apply the program by storing the program in a computer-readable storage medium such as, for example, a flexible disc, the CD-ROM, the DVD-ROM, a memory card and so forth. Further, it is also possible to apply the program via a communication medium such as Internet and so forth by superimposing the program on carrier waves. The program may be distributed by posting the program on, for example, a bulletin board (BBS: Bulletin Board System) on a communication network. Then, the method may be configured so as to run and execute this program in a similar manner as other application programs under control of an OS (Operating System) and thereby to make it possible to execute the above-mentioned processes.

Although the preferable embodiments of the present invention are described as above, the present invention is not limited to such specific embodiments and the scope of the invention which is described in the appended claims and a scope of equivalency thereof are embraced in the present invention.

What is claimed is:

1. A simulation and control method executed by a hardware processor of a simulation device of a shaping system comprising the simulation device, a print device, and an expansion device including a heat source capable of generating electromagnetic waves, the method comprising:
    setting a density of a conversion layer which is formed on a medium which has a thermal expansion layer which expands with heat and converts electromagnetic waves into heat;
    deriving a temperature of the conversion layer which is obtained in a case where the conversion layer which has the set density is irradiated with the electromagnetic waves;
    executing a simulation relating to heat conduction which takes place in a direction along a surface of the medium in the medium based on a condition which is defined in accordance with the medium and correcting the derived temperature based on a result of execution of the simulation;
    deriving an expansion height up to which the medium expands in a case where the medium is heated at the corrected temperature;
    generating print data indicating the set density of the conversion layer, and outputting the generated print data to the print device;
    controlling the print device to execute printing in accordance with the print data output thereto to thereby form the conversion layer having the set density on the medium; and
    controlling the expansion device to irradiate the medium with the electromagnetic waves to thereby expand the thermal expansion layer of the medium at at least a part of a region where the conversion layer is formed.

2. The simulation method according to claim 1, wherein the simulation is executed based on a temperature difference between the derived temperature and an ambient temperature and an index value which is defined in accordance with easiness or difficulty in heat conduction in the medium.

3. The simulation method according to claim 2, wherein the index value differs depending on a type of the medium.

4. The simulation method according to claim 2, wherein the index value differs between a case where the conversion layer is formed on a front-side face of the medium and a case where the conversion layer is formed on a back-side face of the medium.

5. The simulation method according to claim 1, wherein:
    said setting the density of the conversion layer comprises setting the density at each of a plurality of positions on the medium,
    in said deriving the temperature, the temperature is derived from the density which is so set in regard to each of the plurality of positions,
    in said correcting the derived temperature, the derived temperature is corrected based on a difference in temperature between each position and an adjacent position which is adjacent to each position in the plurality of positions in regard to each of the plurality of positions, and
    in said deriving the expansion height, the expansion height is derived from the corrected temperature in regard to each of the plurality of positions.

6. The simulation method according to claim 5, wherein in said correcting the derived temperature, a process of further correcting the derived temperature at each position which is corrected based on of the temperature difference between each position and the adjacent position based on a temperature difference between each position and the adjacent position which is obtained after correction is repetitively executed a number of times which is designated in advance.

7. The simulation method according to claim 6, wherein the number of times differs depending on the type of the medium.

8. The simulation method according to claim 6, wherein the number of times differs between a case where the conversion layer is formed on a front-side face of the medium and a case where the conversion layer is formed on a back-side face of the medium.

9. The simulation method according to claim 5, wherein an interval among the plurality of positions is set to less than half of a minimum value of a width of a bump which is formed by expansion of the medium in the direction along the surface of the medium.

10. The simulation method according to claim 1, wherein
in said deriving the temperature, (i) a corresponding temperature is calculated from the set density based on a corresponding relation between the density and the temperature of the conversion layer which is defined in advance and (ii) a temperature of the conversion layer which is obtained in a case where the conversion layer which has the set density is irradiated with the electromagnetic waves is derived, and
in said deriving the expansion height, (i) a corresponding expansion height is calculated from the corrected temperature based on a corresponding relation between the temperature and the expansion height of the medium which is defined in advance and (ii) the expansion height up to which the medium expands in a case where the medium is heated at the corrected temperature is derived.

11. The simulation and control method according to claim 1, wherein:
said deriving the temperature, said executing the simulation, and said deriving the expansion height are performed before actually generating the print data, controlling the print device to execute printing to form the conversion layer on the medium, and controlling the expansion device to irradiate the medium with the electromagnetic waves.

12. The simulation and control method according to claim 1, further comprising:
receiving, after derivation of the expansion height, input of an instruction to form the conversion layer, and generating the print data indicating the set density of the conversion layer in response to the input of the instruction.

13. The simulation and control method according to claim 1, further comprising:
generating output information which expresses a state where the medium expands up to the derived expansion height in a simulative manner, and outputting the generated output information; and
receiving, during or after output of the generated output information, input of an instruction to form the conversion layer, and generating the print data indicating the set density of the conversion layer in response to the input of the instruction.

14. The simulation and control method according to claim 1, further comprising:
generating an image which expresses a state where the medium expands up to the derived expansion height in a simulative manner, and displaying the generated image on a display; and
receiving, during or after display of the generated image, input of an instruction to form the conversion layer, and generating the print data indicating the set density of the conversion layer in response to the input of the instruction.

15. A non-transitory computer-readable storage medium having stored thereon a program that is executable by a computer of a simulation device of a shaping system comprising the simulation device, a print device, and an expansion device including a heat source capable of generating electromagnetic waves, the program being executable by the computer of the simulation device to control the computer to execute functions comprising:
setting a density of a conversion layer which is formed on a medium which has a thermal expansion layer which expands with heat and converts electromagnetic waves into heat;
deriving a temperature of the conversion layer which is obtained in a case where the conversion layer which has the set density is irradiated with the electromagnetic waves;
executing a simulation relating to heat conduction which takes place in a direction along a surface of the medium in the medium based on a condition which is defined in accordance with the medium and correcting the derived temperature based on a result of execution of the simulation;
deriving an expansion height up to which the medium expands in a case where the medium is heated at the corrected temperature;
generating print data indicating the set density of the conversion layer, and outputting the generated print data to the print device;
controlling the print device to execute printing in accordance with the print data output thereto to thereby form the conversion layer having the set density on the medium; and
controlling the expansion device to irradiate the medium with the electromagnetic waves to thereby expand the thermal expansion layer of the medium at at least a part of a region where the conversion layer is formed.

16. The non-transitory computer readable storage medium according to claim 15, wherein the simulation is executed based on a temperature difference between the derived temperature and an ambient temperature and an index value which is defined in accordance with easiness or difficulty in heat conduction in the medium.

17. The computer readable storage medium according to claim 16, wherein the index value differs depending on a type of the medium.

18. The computer readable storage medium according to claim 17, wherein the index value differs between a case where the conversion layer is formed on a front-side face of the medium and a case where the conversion layer is formed on a back-side face of the medium.

19. A simulation device that is included in a shaping system comprising the simulation device, a print device, and an expansion device including a heat source capable of generating electromagnetic waves, the simulation device comprising:
a hardware processor that is configured to execute processes comprising:
setting a density of a conversion layer which is formed on a medium which has a thermal expansion layer which expands with heat and converts electromagnetic waves into heat, deriving a temperature of the conversion layer which is obtained in a case where the conversion layer which has the set density is irradiated with the electromagnetic waves, executing a simulation relating to heat conduction which takes place in a direction along a surface of the medium in the medium based on a condition which is defined in accordance with the medium and correcting the derived temperature based on a result of execution of the simulation, deriving an expansion height up to which the medium expands in a case where the medium is heated at the corrected temperature, generating print data indicating the set density of the conversion layer, and outputting the generated print data to the print device, controlling the print device to execute printing in accordance with the print data output thereto to thereby form the conversion layer having the set density on the medium, and controlling the expansion device to irradiate the medium with the electromagnetic waves to thereby expand the thermal expansion layer of the medium at at least a part of a region where the conversion layer is formed.

20. The simulation device according to claim 19, further comprising:
a display,
wherein in a case where there exists a region where the expansion height up to which the medium expands in a case where the medium is heated at the corrected temperature is higher than a threshold value, the hardware processor controls the display to display a warning screen.

21. The simulation device according to claim 20, wherein, in displaying the warning, the hardware processor controls the display to display a region where the expansion height is higher than the threshold value in a display form which is different from display forms of other regions.

22. The simulation device according to claim 21, wherein the hardware processor controls the display to display a plurality of the warnings which correspond to a plurality of different types of media side by side.

23. The simulation device according to claim 19, wherein the hardware processor is configured derive the temperature of the conversion layer, execute the simulation relating to heat conduction, and derive the expansion height, before actually generating the print data, controlling the print device to execute printing to form the conversion layer on the medium, and controlling the expansion device to irradiate the medium with the electromagnetic waves.

* * * * *

UNITED STATES PATENT AND TRADEMARK OFFICE
CERTIFICATE OF CORRECTION

| | | |
|---|---|---|
| PATENT NO. | : 11,373,021 B2 | Page 1 of 1 |
| APPLICATION NO. | : 16/749909 | |
| DATED | : June 28, 2022 | |
| INVENTOR(S) | : Semba et al. | |

It is certified that error appears in the above-identified patent and that said Letters Patent is hereby corrected as shown below:

In the Claims

Column 32, Line 65, Claim 6, delete "on of" and insert -- on --.

Signed and Sealed this
Twenty-fifth Day of October, 2022

Katherine Kelly Vidal
*Director of the United States Patent and Trademark Office*